US011645344B2

(12) United States Patent
McGrath et al.

(10) Patent No.: US 11,645,344 B2
(45) Date of Patent: May 9, 2023

(54) ENTITY MAPPING BASED ON INCONGRUENT ENTITY DATA

(71) Applicant: Experian Health, Inc., Franklin, TN (US)

(72) Inventors: Matthew McGrath, Cumming, GA (US); Karly Marie Rowe, Scottsdale, AZ (US); Rachel Dana Goudie, Franklin, TN (US); Matthew McCawley, Marietta, GA (US); Dimuthu Wijetilleke, Atlanta, GA (US)

(73) Assignee: Experian Health, Inc., Franklin, TN (US)

( * ) Notice: Subject to any disclaimer, the term of this patent is extended or adjusted under 35 U.S.C. 154(b) by 254 days.

(21) Appl. No.: 16/815,730

(22) Filed: Mar. 11, 2020

(65) Prior Publication Data

US 2021/0064681 A1    Mar. 4, 2021

Related U.S. Application Data

(60) Provisional application No. 62/891,624, filed on Aug. 26, 2019.

(51) Int. Cl.
*G06F 16/95* (2019.01)
*G06F 16/9535* (2019.01)
*G06F 16/9538* (2019.01)
*G06Q 10/067* (2023.01)

(52) U.S. Cl.
CPC ...... *G06F 16/9535* (2019.01); *G06F 16/9538* (2019.01); *G06Q 10/067* (2013.01)

(58) Field of Classification Search
CPC .................................................. G06F 16/9535
See application file for complete search history.

(56) References Cited

U.S. PATENT DOCUMENTS

| 4,346,442 A | 8/1982 | Musmanno |
| 4,491,725 A | 1/1985 | Pritchard |
| 4,616,854 A | 10/1986 | Landrum et al. |
| 4,692,394 A | 9/1987 | Drexler |
| D297,243 S | 8/1988 | Wells-Papanek et al. |
| 4,869,531 A | 9/1989 | Rees |
| 5,101,476 A | 3/1992 | Kukla |
| 5,301,105 A | 4/1994 | Cummings, Jr. |
| 5,359,509 A | 10/1994 | Little et al. |
| 5,381,487 A | 1/1995 | Shamos |
| 5,483,443 A | 1/1996 | Milstein et al. |

(Continued)

FOREIGN PATENT DOCUMENTS

| EP | 0 297 780 | 1/1989 |
| JP | 2003-216817 | 7/2003 |

(Continued)

*Primary Examiner* — Mohammad S Rostami
(74) *Attorney, Agent, or Firm* — Knobbe, Martens, Olson & Bear, LLP

(57) ABSTRACT

Improved entity identification is provided. Reference data sourced from various data sources may be used to more accurately identify an individual to improve the ability for multiple transaction processing systems to more effectively match identities for the transmission, receipt, and linking of data records. Accordingly, various enterprises are enabled to communicate about a particular entity without each enterprise having the same identifier or having the same, accurate entity demographic information.

20 Claims, 8 Drawing Sheets

(56) References Cited

U.S. PATENT DOCUMENTS

| | | |
|---|---|---|
| 5,500,513 A | 3/1996 | Langhans et al. |
| 5,517,405 A | 5/1996 | McAndrew et al. |
| 5,557,514 A | 9/1996 | Seare et al. |
| 5,583,760 A | 12/1996 | Klesse |
| 5,644,778 A | 7/1997 | Burks et al. |
| 5,748,907 A | 5/1998 | Crane |
| 5,764,923 A | 6/1998 | Tallman et al. |
| 5,832,447 A | 11/1998 | Rieker et al. |
| 5,903,830 A | 5/1999 | Joao et al. |
| 5,903,881 A | 5/1999 | Schrader et al. |
| 5,915,242 A | 6/1999 | Tsujii |
| 5,920,871 A | 7/1999 | Macri et al. |
| 5,991,733 A | 11/1999 | Aleia et al. |
| 5,999,596 A | 12/1999 | Walker et al. |
| 6,003,007 A | 12/1999 | DiRienzo |
| 6,012,035 A | 1/2000 | Freeman, Jr. et al. |
| D420,993 S | 2/2000 | Decker |
| 6,021,943 A | 2/2000 | Chastain |
| 6,044,352 A | 3/2000 | Deavers |
| 6,073,104 A | 6/2000 | Field |
| 6,112,190 A | 8/2000 | Fletcher et al. |
| 6,128,602 A | 10/2000 | Northington et al. |
| 6,157,914 A | 12/2000 | Seto et al. |
| 6,163,770 A | 12/2000 | Gamble et al. |
| 6,199,115 B1 | 3/2001 | DiRienzo |
| 6,202,053 B1 | 3/2001 | Christiansen et al. |
| 6,208,973 B1 | 3/2001 | Boyer et al. |
| 6,233,566 B1 | 5/2001 | Levine et al. |
| 6,304,848 B1 | 10/2001 | Singer |
| 6,327,578 B1 | 12/2001 | Linehan |
| 6,338,093 B1 | 1/2002 | DiRienzo |
| 6,341,265 B1 | 1/2002 | Provost et al. |
| 6,343,271 B1 | 1/2002 | Peterson et al. |
| 6,343,310 B1 | 1/2002 | DiRienzo |
| D455,435 S | 4/2002 | Cassano et al. |
| 6,374,229 B1 | 4/2002 | Lowrey et al. |
| 6,422,462 B1 | 7/2002 | Cohen |
| 6,456,979 B1 | 9/2002 | Flagg |
| 6,480,956 B1 | 11/2002 | DiRienzo |
| 6,513,018 B1 | 1/2003 | Culhane |
| 6,587,830 B2 | 7/2003 | Singer |
| 6,757,898 B1 | 6/2004 | Ilsen |
| 6,826,536 B1 | 11/2004 | Forman |
| 6,904,570 B2 | 6/2005 | Foote et al. |
| 6,928,487 B2 | 8/2005 | Eggebraaten et al. |
| 6,978,268 B2 | 12/2005 | Thomas et al. |
| 6,999,972 B2 | 2/2006 | Lusen et al. |
| 7,006,994 B1 | 2/2006 | Campbell et al. |
| 7,016,856 B1 | 3/2006 | Wiggins |
| 7,034,691 B1 | 4/2006 | Rapaport et al. |
| 7,039,593 B2 | 5/2006 | Sager |
| 7,054,434 B2 | 5/2006 | Rodenbusch et al. |
| 7,069,226 B1 | 6/2006 | Kleinfelter |
| 7,072,842 B2 | 7/2006 | Provost et al. |
| 7,158,629 B2 | 1/2007 | Rodenbusch et al. |
| 7,174,302 B2 | 2/2007 | Patricelli et al. |
| 7,178,020 B2 | 2/2007 | DiRienzo |
| 7,191,150 B1 | 3/2007 | Shao et al. |
| 7,197,468 B1 | 3/2007 | Patricelli et al. |
| 7,246,068 B2 | 7/2007 | Thomas, Jr. |
| 7,260,586 B1 | 8/2007 | Ward |
| 7,263,492 B1 | 8/2007 | Suresh et al. |
| D550,233 S | 9/2007 | Vigesaa |
| 7,305,359 B2 | 12/2007 | Bonnell |
| 7,318,059 B2 | 1/2008 | Thomas et al. |
| 7,333,937 B2 | 2/2008 | Baldwin, Jr. et al. |
| 7,346,768 B2 | 3/2008 | DiRienzo |
| 7,370,018 B2 | 5/2008 | Bryant, Jr. et al. |
| 7,370,349 B2 | 5/2008 | Holvey et al. |
| 7,380,707 B1 | 6/2008 | Fredman |
| 7,401,050 B2 | 7/2008 | O'Neill |
| 7,403,923 B2 | 7/2008 | Elliott et al. |
| 7,409,632 B1 | 8/2008 | DiRienzo |
| 7,426,475 B1 | 9/2008 | Tangellapally et al. |
| 7,464,040 B2 | 12/2008 | Joao |
| 7,467,401 B2 | 12/2008 | Cicchitto |
| 7,490,048 B2 | 2/2009 | Joao |
| 7,493,266 B2 | 2/2009 | Gupta |
| 7,519,553 B2 | 4/2009 | Abe et al. |
| 7,522,038 B2 | 4/2009 | Edwards et al. |
| D593,114 S | 5/2009 | Vakkalanka |
| 7,536,348 B2 | 5/2009 | Shao et al. |
| 7,546,262 B1 | 6/2009 | Ferguson et al. |
| 7,555,720 B2 | 6/2009 | O'Rourke |
| 7,580,831 B2 | 8/2009 | Haskell et al. |
| 7,590,932 B2 | 9/2009 | Britton et al. |
| D604,740 S | 11/2009 | Matheny et al. |
| 7,617,078 B2 | 11/2009 | Rao et al. |
| 7,617,116 B2 | 11/2009 | Amar et al. |
| 7,647,320 B2 | 1/2010 | Mok et al. |
| 7,664,660 B2 | 2/2010 | Korpman et al. |
| 7,668,738 B2 | 2/2010 | Wiggins |
| 7,685,003 B2 | 3/2010 | Hasan et al. |
| 7,689,441 B1 | 3/2010 | Craft |
| 7,689,506 B2 | 3/2010 | Fei et al. |
| 7,693,730 B2 | 4/2010 | Hasan et al. |
| 7,694,129 B2 | 4/2010 | DiRienzo |
| 7,698,153 B2 | 4/2010 | Wiggins |
| 7,720,691 B2 | 5/2010 | Hasan et al. |
| 7,720,700 B2 | 5/2010 | Balogh |
| 7,720,757 B2 | 5/2010 | Srinivasan et al. |
| 7,725,330 B2 | 5/2010 | Rao et al. |
| 7,739,132 B2 | 6/2010 | Denny, Jr. et al. |
| 7,747,453 B2 | 6/2010 | Ulrich et al. |
| 7,747,559 B2 | 6/2010 | Leitner et al. |
| 7,756,728 B2 | 7/2010 | Maughan et al. |
| 7,761,379 B2 | 7/2010 | Zoldi et al. |
| 7,765,148 B2 | 7/2010 | German et al. |
| D621,850 S | 8/2010 | Tarara et al. |
| D622,280 S | 8/2010 | Tarara |
| 7,769,604 B1 | 8/2010 | Lefco et al. |
| 7,778,846 B2 | 8/2010 | Suresh et al. |
| 7,778,850 B2 | 8/2010 | Wester |
| 7,788,040 B2 | 8/2010 | Haskell et al. |
| 7,788,111 B2 | 8/2010 | Haskell et al. |
| D624,089 S | 9/2010 | Dyakov et al. |
| 7,797,165 B1 | 9/2010 | Beery et al. |
| 7,797,172 B2 | 9/2010 | Fitzgerald et al. |
| 7,813,937 B1 | 10/2010 | Pathria et al. |
| 7,822,621 B1 | 10/2010 | Chappel |
| 7,860,786 B2 | 12/2010 | Blackburn et al. |
| 7,865,373 B2 | 1/2011 | Punzak et al. |
| 7,873,528 B2 | 1/2011 | Bregante et al. |
| 7,877,269 B2 | 1/2011 | Bauer et al. |
| 7,885,836 B2 | 2/2011 | Pendleton et al. |
| 7,890,420 B2 | 2/2011 | Haggerty et al. |
| 7,904,305 B2 | 3/2011 | Suringa |
| 7,904,306 B2 | 3/2011 | Johnson et al. |
| 7,917,377 B2 | 3/2011 | Rao et al. |
| 7,917,378 B2 | 3/2011 | Fitzgerald et al. |
| D636,401 S | 4/2011 | Vance et al. |
| D636,779 S | 4/2011 | Boush et al. |
| 7,949,597 B2 | 5/2011 | Zadoorian et al. |
| D640,264 S | 6/2011 | Fujii et al. |
| 7,983,932 B2 | 7/2011 | Kane |
| 8,005,687 B1 | 8/2011 | Pederson et al. |
| 8,014,756 B1 | 9/2011 | Henderson |
| 8,036,918 B1 | 10/2011 | Pinsonneault |
| D648,342 S | 11/2011 | Pearson et al. |
| 8,060,376 B2 | 11/2011 | Horner |
| 8,060,424 B2 | 11/2011 | Kasower |
| 8,069,058 B2 | 11/2011 | Ambrose |
| 8,073,710 B2 | 12/2011 | Hasan et al. |
| 8,078,524 B2 | 12/2011 | Crawford et al. |
| 8,090,742 B2 | 1/2012 | Mok et al. |
| 8,117,045 B2 | 2/2012 | Lorsch |
| 8,117,646 B2 | 2/2012 | Lorsch |
| 8,121,855 B2 | 2/2012 | Lorsch |
| D656,503 S | 3/2012 | Brierley et al. |
| 8,155,979 B2 | 4/2012 | DiRienzo |
| 8,166,562 B2 | 4/2012 | Holvey et al. |
| 8,175,901 B1 | 5/2012 | Lefco et al. |
| 8,180,654 B2 | 5/2012 | Berkman et al. |
| 8,184,408 B2 | 5/2012 | Murakami et al. |

(56) References Cited

U.S. PATENT DOCUMENTS

| | | |
|---|---|---|
| 8,185,408 B2 | 5/2012 | Baldwin, Jr. et al. |
| 8,185,414 B2 | 5/2012 | Law et al. |
| 8,204,762 B2 | 6/2012 | Wester |
| 8,214,232 B2 | 7/2012 | Tyler et al. |
| 8,219,415 B2 | 7/2012 | Tyler et al. |
| 8,229,760 B2 | 7/2012 | Hasan et al. |
| 8,229,770 B2 | 7/2012 | Bregante et al. |
| 8,234,209 B2 | 7/2012 | Zadoorian et al. |
| 8,244,556 B1 | 8/2012 | Ringold |
| 8,250,026 B2 | 8/2012 | Mok et al. |
| 8,260,635 B2 | 9/2012 | Hasan et al. |
| 8,301,466 B2 | 10/2012 | Lorsch |
| 8,306,829 B2 | 11/2012 | Starkey et al. |
| 8,321,239 B2 | 11/2012 | Hasan et al. |
| 8,321,240 B2 | 11/2012 | Lorsch |
| 8,321,243 B1 | 11/2012 | Harris, Sr. et al. |
| 8,326,656 B2 | 12/2012 | Beery et al. |
| 8,332,366 B2 | 12/2012 | Schumacher et al. |
| 8,335,672 B1 | 12/2012 | Ringold |
| 8,352,287 B2 | 1/2013 | Lorsch |
| 8,352,288 B2 | 1/2013 | Lorsch |
| 8,352,538 B2 | 1/2013 | Noonan et al. |
| 8,364,498 B2 | 1/2013 | Sohr et al. |
| 8,364,499 B2 | 1/2013 | Maughan et al. |
| 8,374,885 B2 | 2/2013 | Stibel et al. |
| 8,379,352 B1 | 2/2013 | Braganca et al. |
| 8,380,537 B2 | 2/2013 | Hasan et al. |
| 8,386,274 B1 | 2/2013 | Pinsonneault et al. |
| 8,392,209 B1 | 3/2013 | Bertha et al. |
| 8,392,214 B1 | 3/2013 | Pinsonneault et al. |
| 8,392,219 B1 | 3/2013 | Pinsonneault et al. |
| 8,392,223 B2 | 3/2013 | Hasan et al. |
| 8,407,066 B2 | 3/2013 | Gentry et al. |
| 8,412,542 B2 | 4/2013 | Mok et al. |
| 8,433,586 B2 | 4/2013 | Wester |
| 8,438,184 B1 | 5/2013 | Wang |
| 8,438,657 B2 | 5/2013 | Kaleja |
| 8,442,963 B2 | 5/2013 | Irish et al. |
| 8,443,428 B2 | 5/2013 | Martin et al. |
| 8,447,627 B1 | 5/2013 | Cruise |
| 8,452,611 B1 | 5/2013 | Johnson et al. |
| 8,463,816 B2 | 6/2013 | Skubacz et al. |
| 8,473,310 B2 | 6/2013 | Hasan et al. |
| D685,813 S | 7/2013 | Bork et al. |
| 8,489,415 B1 | 7/2013 | Ringold |
| 8,489,423 B2 | 7/2013 | Hasan et al. |
| 8,489,424 B2 | 7/2013 | Hasan et al. |
| 8,498,883 B2 | 7/2013 | Lorsch |
| D687,451 S | 8/2013 | Ghadge |
| 8,510,807 B1 | 8/2013 | Elazary et al. |
| 8,521,557 B1 | 8/2013 | Ringold et al. |
| 8,527,292 B1 | 9/2013 | Ozden |
| 8,583,684 B1 | 11/2013 | Kirmse |
| 8,620,725 B2 | 12/2013 | Neuweg et al. |
| 8,639,522 B2 | 1/2014 | Pathria et al. |
| 8,660,855 B2 | 2/2014 | Pourfallah et al. |
| 8,666,757 B2 | 3/2014 | Suresh et al. |
| 8,682,688 B1 | 3/2014 | Coluni et al. |
| 8,694,390 B2 | 4/2014 | Imrey et al. |
| 8,762,369 B2 | 6/2014 | Macho et al. |
| 8,768,826 B2 | 7/2014 | Imrey et al. |
| 8,775,291 B1 | 7/2014 | Mellman et al. |
| 8,781,850 B2 | 7/2014 | Bazzani et al. |
| D716,333 S | 10/2014 | Chotin et al. |
| 8,874,476 B1 | 10/2014 | Taylor, III et al. |
| D721,723 S | 1/2015 | Sureshkumar |
| 8,930,216 B1 | 1/2015 | Johnson et al. |
| 8,943,565 B2 | 1/2015 | Magee et al. |
| D727,928 S | 4/2015 | Allison et al. |
| 9,002,883 B1 | 4/2015 | Kirmse |
| D728,589 S | 5/2015 | Tarara-Byyny et al. |
| D737,831 S | 9/2015 | Lee |
| D748,126 S | 1/2016 | Sarukkai et al. |
| 9,262,481 B1 * | 2/2016 | Le .................... G06Q 50/01 |
| D754,144 S | 4/2016 | Vazquez et al. |
| D754,675 S | 4/2016 | Vazquez et al. |
| D754,676 S | 4/2016 | Vazquez et al. |
| 9,324,111 B2 | 4/2016 | Long et al. |
| D757,070 S | 5/2016 | Dziuba |
| D764,506 S | 8/2016 | Rathke et al. |
| D769,263 S | 10/2016 | Jussekev et al. |
| D774,052 S | 12/2016 | Gedrich et al. |
| D774,058 S | 12/2016 | Dias et al. |
| 9,514,327 B2 | 12/2016 | Ford |
| 9,529,923 B1 | 12/2016 | Baird, III |
| D781,887 S | 3/2017 | Dziuba et al. |
| D782,526 S | 3/2017 | Rind et al. |
| 9,589,058 B2 | 3/2017 | Balduzzi et al. |
| 9,613,190 B2 | 4/2017 | Ford et al. |
| D790,586 S | 6/2017 | Gopalan et al. |
| D793,420 S | 8/2017 | Noack |
| D794,047 S | 8/2017 | Gandhi et al. |
| D795,274 S | 8/2017 | Rhodes et al. |
| D798,312 S | 9/2017 | Tsujimura et al. |
| 9,762,533 B2 | 9/2017 | Ren et al. |
| 9,762,553 B2 | 9/2017 | Ford et al. |
| 9,830,464 B2 | 11/2017 | Busch |
| 9,847,985 B2 | 12/2017 | Ochs et al. |
| D808,986 S | 1/2018 | Dudey |
| D812,081 S | 3/2018 | Saneii |
| 9,928,108 B1 | 3/2018 | Wagner et al. |
| D819,071 S | 5/2018 | Rathke et al. |
| 9,965,519 B2 | 5/2018 | Hattori et al. |
| 10,033,733 B2 | 7/2018 | Baltzer et al. |
| D831,049 S | 10/2018 | Agarwal et al. |
| 10,102,598 B2 | 10/2018 | MacKenzie et al. |
| D833,458 S | 11/2018 | Blechschmidt et al. |
| D833,459 S | 11/2018 | Blechschmidt et al. |
| D833,460 S | 11/2018 | Blechschmidt et al. |
| 10,122,799 B2 | 11/2018 | Behunin |
| 10,185,836 B2 | 1/2019 | Busch |
| 10,187,399 B2 | 1/2019 | Katz |
| D841,675 S | 2/2019 | Hoffman et al. |
| 10,237,262 B2 | 3/2019 | Ochs et al. |
| 10,275,576 B2 | 4/2019 | Furst et al. |
| 10,275,828 B2 | 4/2019 | Reisz et al. |
| D854,030 S | 7/2019 | Dascola et al. |
| D854,560 S | 7/2019 | Field et al. |
| D854,561 S | 7/2019 | Field et al. |
| D854,566 S | 7/2019 | Hsueh et al. |
| 10,339,271 B2 | 7/2019 | Beaton et al. |
| 10,354,211 B1 | 7/2019 | Pilkington et al. |
| 10,362,135 B2 | 7/2019 | McNeese et al. |
| 10,366,351 B2 | 7/2019 | Whittier et al. |
| 10,380,320 B2 | 8/2019 | Farmer et al. |
| 10,387,615 B2 | 8/2019 | Derer |
| 10,402,480 B2 | 9/2019 | Aghaiipour |
| 10,402,539 B2 | 9/2019 | Johnson et al. |
| 10,410,305 B1 | 9/2019 | Pilkington et al. |
| 10,419,347 B2 | 9/2019 | Porteous et al. |
| 10,430,428 B2 | 10/2019 | Ott et al. |
| 10,462,004 B2 | 10/2019 | Hsiao et al. |
| D871,431 S | 12/2019 | Cullum et al. |
| 10,506,051 B2 | 12/2019 | Behunin |
| 10,510,046 B2 | 12/2019 | Whittier et al. |
| 10,546,098 B2 | 1/2020 | Derer |
| 10,614,495 B2 | 4/2020 | Busch et al. |
| 10,664,463 B2 | 5/2020 | Ananthakrishnan |
| D888,084 S | 6/2020 | Doti et al. |
| 10,685,401 B1 | 6/2020 | Hanson et al. |
| 10,701,057 B2 | 6/2020 | Ochs et al. |
| 10,733,546 B2 | 8/2020 | Pilkington et al. |
| 10,740,332 B2 | 8/2020 | Zhang et al. |
| 10,783,137 B2 | 9/2020 | Katz |
| 10,817,966 B2 | 10/2020 | Dennis et al. |
| 10,853,900 B2 | 12/2020 | Hua et al. |
| 10,891,268 B2 | 1/2021 | Dennis et al. |
| 10,902,002 B2 | 1/2021 | Johnson et al. |
| 11,080,110 B2 | 8/2021 | Pilkington et al. |
| 11,101,805 B2 | 8/2021 | McGrath |
| 11,102,311 B2 | 8/2021 | Kurth et al. |
| 11,194,829 B2 | 12/2021 | Dennis et al. |
| 11,327,975 B2 | 5/2022 | Rowe et al. |
| 11,334,822 B2 | 5/2022 | Long et al. |

(56) References Cited

U.S. PATENT DOCUMENTS

| | | |
|---|---|---|
| 2001/0014868 A1 | 8/2001 | Herz et al. |
| 2002/0010594 A1 | 1/2002 | Levine |
| 2002/0062249 A1 | 5/2002 | Iannacci |
| 2002/0077869 A1 | 6/2002 | Doyle et al. |
| 2002/0099635 A1 | 7/2002 | Guiragosian |
| 2002/0103680 A1 | 8/2002 | Newman |
| 2002/0116245 A1 | 8/2002 | Hinkle et al. |
| 2002/0123946 A1 | 9/2002 | Haworth et al. |
| 2002/0138417 A1 | 9/2002 | Lawrence |
| 2002/0147617 A1 | 10/2002 | Schoenbaum et al. |
| 2002/0188467 A1 | 12/2002 | Eke |
| 2002/0198741 A1 | 12/2002 | Randazzo |
| 2002/0198796 A1 | 12/2002 | White et al. |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0041019 A1 | 2/2003 | Vagim, III et al. |
| 2003/0050795 A1 | 3/2003 | Baldwin, Jr. et al. |
| 2003/0105648 A1 | 6/2003 | Schurenberg et al. |
| 2003/0219709 A1 | 11/2003 | Olenick et al. |
| 2003/0229507 A1 | 12/2003 | Perge |
| 2003/0233259 A1 | 12/2003 | Mistretta et al. |
| 2003/0233278 A1 | 12/2003 | Marshall |
| 2003/0236747 A1 | 12/2003 | Sager |
| 2004/0006489 A1 | 1/2004 | Bynon |
| 2004/0044604 A1 | 3/2004 | O'Neil |
| 2004/0073456 A1 | 4/2004 | Gottlieb et al. |
| 2004/0073457 A1 | 4/2004 | Kalies |
| 2004/0078228 A1 | 4/2004 | Fitzgerald et al. |
| 2004/0111292 A1 | 6/2004 | Hutchins |
| 2004/0117211 A1 | 6/2004 | Bonnell |
| 2004/0148203 A1 | 7/2004 | Whitaker et al. |
| 2004/0153336 A1 | 8/2004 | Virdee et al. |
| 2004/0172313 A1 | 9/2004 | Stein et al. |
| 2005/0015280 A1 | 1/2005 | Gabel et al. |
| 2005/0038670 A1 | 2/2005 | Takkar et al. |
| 2005/0044357 A1 | 2/2005 | Fano |
| 2005/0065816 A1 | 3/2005 | Limberg et al. |
| 2005/0086071 A1 | 4/2005 | Fox, Jr. et al. |
| 2005/0086072 A1 | 4/2005 | Fox, Jr. et al. |
| 2005/0091080 A1 | 4/2005 | Biats, Jr. |
| 2005/0091164 A1 | 4/2005 | Varble |
| 2005/0187948 A1 | 8/2005 | Monitzer et al. |
| 2005/0197954 A1 | 9/2005 | Maitland et al. |
| 2005/0209880 A1 | 9/2005 | Drelicharz et al. |
| 2005/0209885 A1 | 9/2005 | Lamb et al. |
| 2005/0209893 A1 | 9/2005 | Nahra et al. |
| 2005/0228692 A1 | 10/2005 | Hodgon |
| 2005/0234789 A1 | 10/2005 | Czyzewski et al. |
| 2005/0246200 A1 | 11/2005 | Thompson et al. |
| 2005/0251429 A1 | 11/2005 | Ammer et al. |
| 2005/0288964 A1 | 12/2005 | Lutzen et al. |
| 2006/0020360 A1 | 1/2006 | Wu |
| 2006/0026156 A1 | 2/2006 | Zuleba |
| 2006/0031301 A1 | 2/2006 | Herz et al. |
| 2006/0074991 A1 | 4/2006 | Lussier et al. |
| 2006/0080139 A1 | 4/2006 | Mainzer |
| 2006/0136264 A1 | 6/2006 | Ealon |
| 2006/0149603 A1 | 7/2006 | Patterson et al. |
| 2006/0178915 A1 | 8/2006 | Chao |
| 2006/0184397 A1 | 8/2006 | Wester |
| 2006/0190334 A1 | 8/2006 | Smith |
| 2006/0212315 A1 | 9/2006 | Wiggins |
| 2006/0235743 A1 | 10/2006 | Long et al. |
| 2006/0247947 A1 | 11/2006 | Suringa |
| 2006/0247949 A1 | 11/2006 | Shorrosh |
| 2006/0247991 A1 | 11/2006 | Jin et al. |
| 2006/0282359 A1 | 12/2006 | Nobili et al. |
| 2006/0287949 A1 | 12/2006 | Silverman |
| 2006/0293923 A1 | 12/2006 | Farris |
| 2007/0005402 A1 | 1/2007 | Kennedy et al. |
| 2007/0005403 A1 | 1/2007 | Kennedy et al. |
| 2007/0011026 A1 | 1/2007 | Higgins et al. |
| 2007/0022141 A1 | 1/2007 | Singleton et al. |
| 2007/0043659 A1 | 2/2007 | Kass et al. |
| 2007/0043661 A1 | 2/2007 | Kass et al. |
| 2007/0050208 A1 | 3/2007 | Bardis et al. |
| 2007/0050219 A1 | 3/2007 | Sohr et al. |
| 2007/0061393 A1 | 3/2007 | Moore |
| 2007/0100943 A1 | 5/2007 | Brunswig et al. |
| 2007/0118410 A1 | 5/2007 | Nadai |
| 2007/0124235 A1 | 5/2007 | Chakraborty et al. |
| 2007/0168234 A1 | 7/2007 | Ruthowski et al. |
| 2007/0174122 A1 | 7/2007 | Howard et al. |
| 2007/0198336 A1 | 8/2007 | Thompson |
| 2007/0198407 A1 | 8/2007 | Winter |
| 2007/0203750 A1 | 8/2007 | Volcheck |
| 2007/0208640 A1 | 9/2007 | Banasiak et al. |
| 2007/0214005 A1 | 9/2007 | Kennedy |
| 2007/0233519 A1 | 10/2007 | Lorsch |
| 2007/0258626 A1 | 11/2007 | Reiner |
| 2007/0266439 A1 | 11/2007 | Kraft |
| 2007/0276750 A1 | 11/2007 | Stuart |
| 2007/0279187 A1 | 12/2007 | Hekmatpour et al. |
| 2007/0294126 A1 | 12/2007 | Maggio |
| 2007/0299697 A1 | 12/2007 | Friedlander et al. |
| 2007/0299699 A1 | 12/2007 | Policelli et al. |
| 2007/0299776 A1 | 12/2007 | Frustaci et al. |
| 2008/0005669 A1 | 1/2008 | Eilertsen et al. |
| 2008/0010096 A1 | 1/2008 | Patterson et al. |
| 2008/0033750 A1 | 2/2008 | Burriss et al. |
| 2008/0046803 A1 | 2/2008 | Beauchamp et al. |
| 2008/0059224 A1 | 3/2008 | Schechter |
| 2008/0091463 A1 | 4/2008 | Shakamuri |
| 2008/0109315 A1 | 5/2008 | Huang et al. |
| 2008/0120133 A1 | 5/2008 | Krishnaswami et al. |
| 2008/0133325 A1 | 6/2008 | De et al. |
| 2008/0140599 A1 | 6/2008 | Pacha et al. |
| 2008/0183504 A1 | 7/2008 | Highley |
| 2008/0183693 A1 | 7/2008 | Arasu et al. |
| 2008/0189202 A1 | 8/2008 | Zadoorian et al. |
| 2008/0195600 A1 | 8/2008 | Deakter |
| 2008/0208631 A1 | 8/2008 | Morita et al. |
| 2008/0208633 A1 | 8/2008 | Navani |
| 2008/0208914 A1 | 8/2008 | Navani |
| 2008/0244008 A1 | 10/2008 | Wilkinson et al. |
| 2008/0270363 A1 | 10/2008 | Hunt et al. |
| 2008/0275737 A1 | 11/2008 | Gentry et al. |
| 2008/0288283 A1 | 11/2008 | Baldwin, Jr. et al. |
| 2008/0300893 A1 | 12/2008 | Mendoza et al. |
| 2009/0006439 A1 | 1/2009 | Joseph et al. |
| 2009/0019552 A1 | 1/2009 | McLaughlin et al. |
| 2009/0024517 A1 | 1/2009 | Crooks |
| 2009/0024623 A1 | 1/2009 | Broder et al. |
| 2009/0030727 A1 | 1/2009 | Revak et al. |
| 2009/0037323 A1 | 2/2009 | Feinstein et al. |
| 2009/0048877 A1 | 2/2009 | Binns et al. |
| 2009/0048897 A1 | 2/2009 | Parikshya et al. |
| 2009/0055222 A1 | 2/2009 | Lorsch |
| 2009/0063197 A1 | 3/2009 | Lisle |
| 2009/0094055 A1 | 4/2009 | Gage, Jr. et al. |
| 2009/0094064 A1 | 4/2009 | Tyler et al. |
| 2009/0106178 A1 | 4/2009 | Chu |
| 2009/0106242 A1 | 4/2009 | McGrew et al. |
| 2009/0138277 A1 | 5/2009 | Warren et al. |
| 2009/0144088 A1 | 6/2009 | Zubiller et al. |
| 2009/0144094 A1 | 6/2009 | Morey et al. |
| 2009/0157435 A1 | 6/2009 | Seib |
| 2009/0177480 A1 | 7/2009 | Chen et al. |
| 2009/0187432 A1 | 7/2009 | Scalet et al. |
| 2009/0248481 A1 | 10/2009 | Dick et al. |
| 2009/0254375 A1 | 10/2009 | Martinez et al. |
| 2009/0271220 A1 | 10/2009 | Radoccia et al. |
| 2009/0281827 A1 | 11/2009 | Pendleton et al. |
| 2009/0287837 A1 | 11/2009 | Feisher |
| 2009/0319294 A1 | 12/2009 | Phillips et al. |
| 2009/0326976 A1 | 12/2009 | Morris |
| 2010/0049695 A2 | 2/2010 | Morsa |
| 2010/0063907 A1 | 3/2010 | Savani et al. |
| 2010/0070296 A1 | 3/2010 | Massoumi et al. |
| 2010/0070307 A1 | 3/2010 | Sinvhal-Sharma |
| 2010/0142698 A1 | 6/2010 | Spottiswoode et al. |
| 2010/0175024 A1 | 7/2010 | Schumacher et al. |
| 2010/0179838 A1 | 7/2010 | Basant et al. |

(56) References Cited

U.S. PATENT DOCUMENTS

| | | |
|---|---|---|
| 2010/0183199 A1 | 7/2010 | Smith et al. |
| 2010/0217622 A1 | 8/2010 | Brown et al. |
| 2010/0217837 A1 | 8/2010 | Ansari et al. |
| 2010/0229184 A1 | 9/2010 | Satou et al. |
| 2010/0257074 A1 | 10/2010 | Hendrickson |
| 2010/0274582 A1 | 10/2010 | Beraja et al. |
| 2010/0274583 A1 | 10/2010 | Beraja et al. |
| 2010/0280843 A1 | 11/2010 | Beraja et al. |
| 2010/0293090 A1 | 11/2010 | Domenikos et al. |
| 2010/0305993 A1 | 12/2010 | Fisher |
| 2010/0318372 A1 | 12/2010 | Band et al. |
| 2010/0332252 A1 | 12/2010 | Beraja et al. |
| 2011/0002384 A1 | 1/2011 | Mallat et al. |
| 2011/0010189 A1 | 1/2011 | Dean et al. |
| 2011/0015946 A1 | 1/2011 | Buckowsky et al. |
| 2011/0071846 A1 | 3/2011 | Crystal et al. |
| 2011/0071854 A1 | 3/2011 | Medeiros et al. |
| 2011/0082794 A1 | 4/2011 | Blechman |
| 2011/0099025 A1 | 4/2011 | Blum |
| 2011/0099027 A1 | 4/2011 | Weathers |
| 2011/0106617 A1 | 5/2011 | Cooper |
| 2011/0112873 A1 | 5/2011 | Allen et al. |
| 2011/0126275 A1 | 5/2011 | Anderson et al. |
| 2011/0247051 A1 | 10/2011 | Bulumulla et al. |
| 2011/0251855 A1 | 10/2011 | Lorsch |
| 2011/0257992 A1 | 10/2011 | Scantland et al. |
| 2012/0046965 A1 | 2/2012 | Ryan et al. |
| 2012/0059674 A1 | 3/2012 | Horner |
| 2012/0078663 A1 | 3/2012 | Lorsch |
| 2012/0101847 A1 | 4/2012 | Johnson et al. |
| 2012/0102101 A1 | 4/2012 | Wenig et al. |
| 2012/0116807 A1 | 5/2012 | Hane et al. |
| 2012/0123789 A1 | 5/2012 | Patel |
| 2012/0130724 A1 | 5/2012 | Flegel et al. |
| 2012/0130746 A1 | 5/2012 | Baker |
| 2012/0143637 A1 | 6/2012 | Paradis et al. |
| 2012/0191479 A1 | 7/2012 | Gupta et al. |
| 2012/0203572 A1 | 8/2012 | Christensen |
| 2012/0203798 A1 | 8/2012 | Gifford et al. |
| 2012/0215552 A1 | 8/2012 | Goldschmidt |
| 2012/0215768 A1 | 8/2012 | Zellweger |
| 2012/0265553 A1 | 10/2012 | Baldwin, Jr. et al. |
| 2012/0290660 A1 | 11/2012 | Rao et al. |
| 2012/0303386 A1 | 11/2012 | Zavaleta et al. |
| 2012/0331567 A1 | 12/2012 | Shelton |
| 2013/0018671 A1 | 1/2013 | Hussam |
| 2013/0054274 A1 | 2/2013 | Katyal |
| 2013/0080192 A1 | 3/2013 | Bucur et al. |
| 2013/0090945 A1 | 4/2013 | Horner |
| 2013/0096942 A1 | 4/2013 | Bowles et al. |
| 2013/0110704 A1 | 5/2013 | Padron et al. |
| 2013/0138458 A1 | 5/2013 | Lorsch |
| 2013/0138555 A1 | 5/2013 | Shishkov |
| 2013/0144645 A1 | 6/2013 | Bjorner et al. |
| 2013/0179194 A1 | 7/2013 | Lorsch |
| 2013/0179195 A1 | 7/2013 | Lorsch |
| 2013/0191163 A1 | 7/2013 | Lorsch |
| 2013/0231960 A1 | 9/2013 | Lorsch |
| 2013/0282394 A1 | 10/2013 | Baldwin et al. |
| 2014/0012740 A1* | 1/2014 | Carson .................. G06Q 40/00 705/39 |
| 2014/0012780 A1 | 1/2014 | Sanders |
| 2014/0039929 A1 | 2/2014 | Vdovjak et al. |
| 2014/0095239 A1 | 4/2014 | Mansfield et al. |
| 2014/0095541 A1 | 4/2014 | Herwadkar et al. |
| 2014/0142964 A1 | 5/2014 | Lang et al. |
| 2014/0149135 A1 | 5/2014 | Boerger et al. |
| 2014/0149303 A1 | 5/2014 | Band et al. |
| 2014/0180826 A1 | 6/2014 | Boal |
| 2014/0189483 A1 | 7/2014 | Awan et al. |
| 2014/0189818 A1 | 7/2014 | Meyer |
| 2014/0222684 A1 | 8/2014 | Feisher |
| 2014/0236572 A1 | 8/2014 | Meshulam et al. |
| 2014/0244276 A1 | 8/2014 | Dyke et al. |
| 2014/0245015 A1 | 8/2014 | Velmmoor et al. |
| 2014/0365242 A1 | 12/2014 | Neff |
| 2014/0379361 A1 | 12/2014 | Mahadkar et al. |
| 2014/0379374 A1 | 12/2014 | Vinals |
| 2015/0113393 A1 | 4/2015 | Burgin et al. |
| 2015/0120725 A1 | 4/2015 | de Vries et al. |
| 2015/0127364 A1 | 5/2015 | Long et al. |
| 2015/0135300 A1 | 5/2015 | Ford |
| 2015/0154698 A1 | 6/2015 | Stibel et al. |
| 2015/0163206 A1 | 6/2015 | McCarthy et al. |
| 2015/0186403 A1* | 7/2015 | Srivastava ............ G06F 16/215 707/692 |
| 2015/0193749 A1 | 7/2015 | Ivanoff et al. |
| 2015/0286747 A1 | 10/2015 | Anastasakos et al. |
| 2015/0310188 A1 | 10/2015 | Ford et al. |
| 2015/0324920 A1 | 11/2015 | Wilson et al. |
| 2015/0348188 A1 | 12/2015 | Chen |
| 2015/0356142 A1 | 12/2015 | Proux |
| 2016/0011746 A1 | 1/2016 | Lategan |
| 2016/0034642 A1* | 2/2016 | Ehrhart .................. G16H 10/60 705/3 |
| 2016/0037197 A1 | 2/2016 | Kitts et al. |
| 2016/0041800 A1 | 2/2016 | Jacobs et al. |
| 2016/0055142 A1 | 2/2016 | Strassner |
| 2016/0062903 A1 | 3/2016 | Gao et al. |
| 2016/0086222 A1 | 3/2016 | Kurapati |
| 2016/0092641 A1 | 3/2016 | Delaney et al. |
| 2016/0104508 A1* | 4/2016 | Chee .................. H04N 21/4788 386/227 |
| 2016/0125149 A1 | 5/2016 | Abramowitz |
| 2016/0132605 A1 | 5/2016 | Jiang |
| 2016/0147844 A1 | 5/2016 | Adderly et al. |
| 2016/0203279 A1 | 7/2016 | Srinivas et al. |
| 2016/0231900 A1 | 8/2016 | Meaney et al. |
| 2016/0267115 A1 | 9/2016 | Pletcher et al. |
| 2016/0342758 A1 | 11/2016 | Ivnoff |
| 2017/0039242 A1 | 2/2017 | Milton et al. |
| 2017/0053002 A1 | 2/2017 | Bowman et al. |
| 2017/0091388 A1* | 3/2017 | Zolla .................. G06F 16/254 |
| 2017/0091861 A1 | 3/2017 | Bianchi et al. |
| 2017/0098284 A1* | 4/2017 | Schneider .......... G06Q 10/1095 |
| 2017/0116373 A1 | 4/2017 | Ginsburg et al. |
| 2017/0124526 A1 | 5/2017 | Sanderford et al. |
| 2017/0169168 A1 | 6/2017 | Batchelor et al. |
| 2017/0235901 A1 | 8/2017 | Johnson et al. |
| 2017/0249651 A1* | 8/2017 | Pulitzer .................. H04W 4/21 |
| 2017/0272816 A1* | 9/2017 | Olds .................... H04L 67/306 |
| 2017/0329468 A1 | 11/2017 | Schon et al. |
| 2018/0039705 A1* | 2/2018 | Eyal ........................ G06F 16/29 |
| 2018/0165349 A1 | 6/2018 | Vaughan |
| 2018/0191867 A1 | 7/2018 | Siebel et al. |
| 2018/0285872 A1 | 10/2018 | Millhouse et al. |
| 2018/0285969 A1 | 10/2018 | Busch et al. |
| 2018/0293249 A1* | 10/2018 | Tabares ............. G06Q 30/0203 |
| 2019/0095991 A1 | 3/2019 | Swaminathan et al. |
| 2019/0206520 A1 | 7/2019 | Eteminan et al. |
| 2019/0236714 A1 | 8/2019 | Hoerle et al. |
| 2019/0304599 A1 | 10/2019 | Hoffman et al. |
| 2020/0034926 A1 | 1/2020 | Busch et al. |
| 2020/0126137 A1 | 4/2020 | Pilkington et al. |
| 2020/0403956 A1* | 12/2020 | Adamski ................ G06Q 50/01 |
| 2021/0035679 A1 | 2/2021 | Pankoke et al. |
| 2021/0064681 A1 | 3/2021 | McGrath et al. |
| 2021/0142914 A1 | 5/2021 | Hua et al. |
| 2021/0304265 A1 | 9/2021 | Yedlarajaiah et al. |
| 2022/0076813 A1* | 3/2022 | Green .................... G16H 40/20 |

FOREIGN PATENT DOCUMENTS

| | | |
|---|---|---|
| JP | 2004-126793 | 4/2004 |
| WO | WO 03/048889 | 6/2003 |
| WO | WO 2007/022510 | 2/2007 |
| WO | WO 2008/133721 | 11/2008 |
| WO | WO 2022/006441 | 1/2022 |

\* cited by examiner

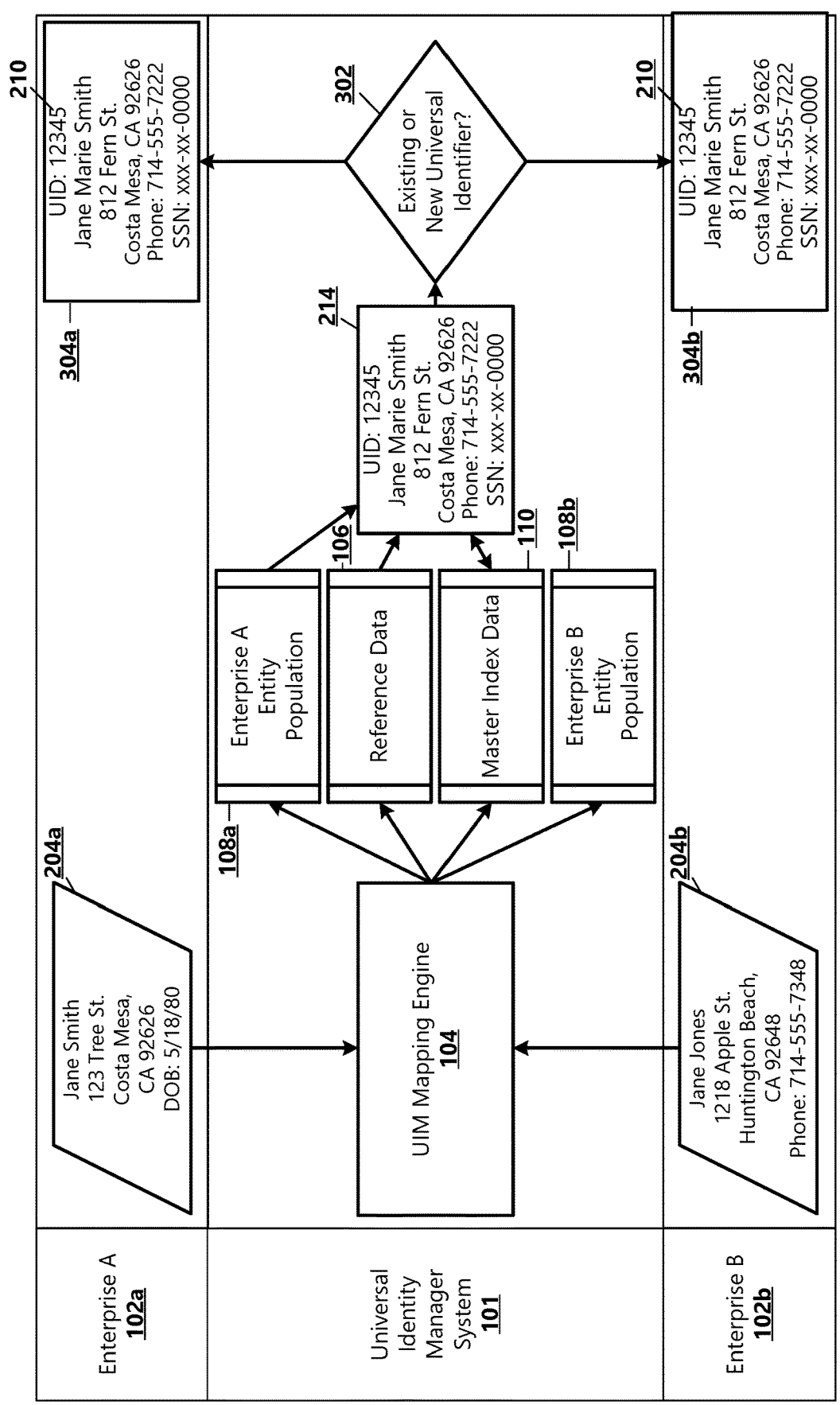

ENTITY MAPPING BASED ON INCONGRUENT ENTITY DATA

CROSS-REFERENCE TO RELATED APPLICATIONS

This application claims the benefit of U.S. Provisional Application No. 62/891,624, having the title of "Entity Mapping Based on Incongruent Entity Data" and the filing date of Aug. 26, 2019, which is incorporated herein by reference in its entirety.

BACKGROUND

Oftentimes, there is a need to communicate about a particular individual across various enterprises for various purposes (e.g., a patient seeking healthcare services, a loan applicant seeking financial services, a student in an educational context). However, when the various enterprises use different identifiers (e.g., enterprise-specific identifiers) to uniquely identify individuals, it can be difficult for the enterprises to determine whether they are referencing the same individual or different individuals. This challenge is oftentimes further compounded when not only identifiers are different for an individual, but when demographic information may also be incongruent. For example, each enterprise may have different standards for the types of information they collect on an individual, and the information they have for an individual may only be as current as their last interaction with the individual, as accurate as an administrative user has entered the information, or as compete or accurate as the individual providing the information want it to be. Miscommunication about an individual can result in incorrect services being provided, incorrect care, exposure of private or sensitive information, and other issues related to the individual's safety and/or overall operational efficiency.

For example, in a healthcare context, there currently is no government-mandated, single nationwide patient identifier. As a result, there may be multiple identifiers and matching technologies across the healthcare industry. Each matching technology may create a type of identifier that can vary based on use case and need; however, there is not a way of communicating across enterprises if the enterprises are using different identifiers. Examples of types of identifiers that various healthcare providers (e.g., hospitals, physician offices, pharmacies) may use may include enterprise-specific identifiers (e.g., identifiers specific to a particular healthcare enterprise), universal/national/state identifiers (e.g., social security numbers), and non-constant identifiers (e.g., identifiers created for a singular use or at a singular point and time). Accordingly, there is no common language that healthcare enterprises can use to communicate about a patient.

The need to communicate about a patient across healthcare enterprises exists for various purposes, such as for issuance of electronic prescriptions, specialists coordinating care/services for a patient, etc. As an example, Physician A sends an electronic prescription to Pharmacy X for Patient John Doe. In Physician A's system, Patient John Doe has an enterprise identifier 123. In Pharmacy X's system, Patient John Doe has an enterprise identifier 456 with a different address and different last name, but it is the same unique person. With mismatching demographics and different enterprise-specific identifiers, these two systems may have no way of knowing whether they are talking about two actually different patients or the same patient. Oftentimes in such as case, a new record may be created, which results in the average patient having multiple records within a single healthcare enterprise. As can be appreciated, the number of separate un-linked records created for a single individual may grow exponentially when considering the entire healthcare ecosystem with which the individual may interact. These new records are duplicates of existing patients and can result in scenarios when a patient shows up at the pharmacy ready to pick up a prescription, but the prescription isn't ready/available due to an inability to link it properly. The patient may have to wait and may become frustrated at the waste of his/her time, thus resulting in a bad user-experience and low patient satisfaction. Moreover, if two patient profiles are created for the same individual, and with each profile maintaining only a portion of the patient's medications, incomplete drug utilization review (i.e., the process of identifying drug interactions) may lead to incorrect medication administration or dispensing, which can result in serious adverse actions or even death.

SUMMARY

Aspects of the present disclosure provide a technical improvement to entity matching by using various reference data and by mapping different identifiers using a universal identifier as an answer key. A universal identity manager system and mapping engine described herein provides improvements to match rate accuracy, which can improve safety for individuals (e.g., can reduce incomplete or unlinked individual profiles), reduce computer memory usage (e.g., for storage of duplicate records being created for a same individual), reduce manual intervention, reduce labor costs, improve the overall customer experience, and improve other issues related to the individual's safety and/or overall operational efficiency among other benefits that will be recognized by those of ordinary skill in the art upon reading the specification.

The mapping engine may be configured to receive a request from a first enterprise to identify an individual/entity described by demographic data included in the request. For example, the demographic data may be provided by a second enterprise, and that data may not match demographic data that the first enterprise has stored for an individual in the first enterprise's entity database. The first enterprise may use the mapping engine to determine whether the entity described by the demographic data may actually be an entity in their entity database, but who is described by different demographic data. Prior to sending the request to the mapping engine, the first enterprise may send a data file comprising an enumeration of their entity database to the mapping engine. The data file may include demographic data of entities associated with the first enterprise and an entity-specific identifier for each entity. The mapping engine may store, in a master index, a listing of the entities included in the data file with the entity's demographic data and entity-specific identifier, and may further assign a universal identifier to each entity. The mapping engine may further determine whether an entity included in the data file is associated with a plurality of entity-specific identifiers, and may associate the plurality of entity-specific identifiers with the entity.

Responsive to the request from the first enterprise, the mapping engine may query the master index using the demographic data included in the request to determine a match. If a match is not determined, the mapping engine may use the demographic data to query one or more reference databases for additional/other demographic data about the entity. For example, the reference database(s) may store reference data sourced from various data sources. The reference data may be used to more accurately identify an individual to improve the ability for multiple systems to more effectively match identities for the transmission, receipt, and linking of data records. The mapping engine may use the additional/other demographic (e.g., reference data) to query the master index for a universal identifier corresponding to the additional/other demographic data, map the universal identifier to one or more enterprise-specific identifiers associated with the entity, and generate a response to the request including the one or more enterprise-specific identifiers associated with the entity. In some examples, the response may include the universal identifier. In other examples, the response may include demographic data determined to be current for the entity based on the additional/other demographic (e.g., reference data).

Accordingly, improved entity identification is provided, wherein various enterprises are enabled to communicate about a particular entity without each enterprise having the same identifier or having the same or accurate entity demographic information.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

FIG. 3B illustrates example data responses including updated entity information that may be provided to a requestor;

DETAILED DESCRIPTION

Figure 1A:
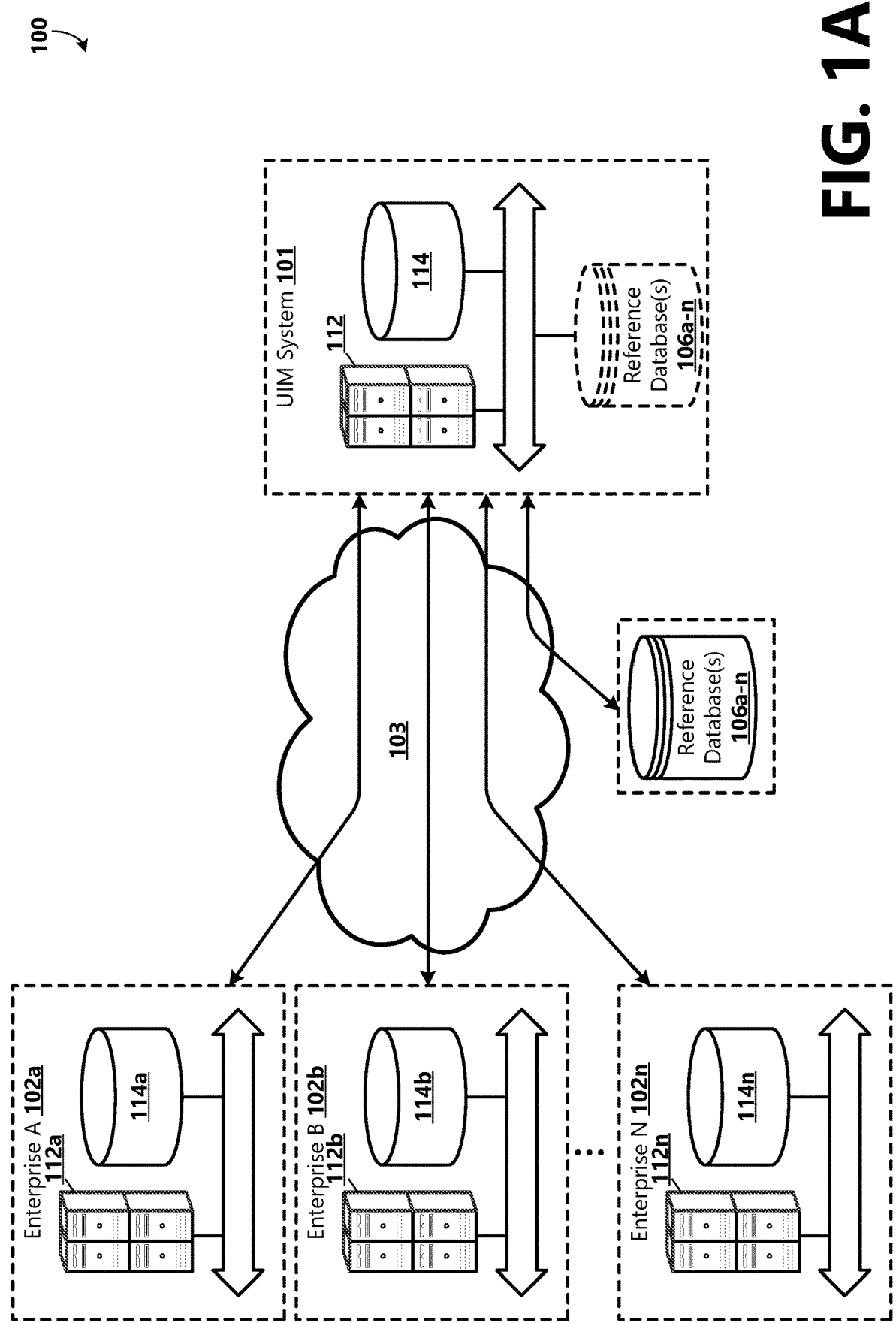
FIGS. 1A and 1B illustrate an example operating environment in which various aspects of a universal identity manager may operate.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense. Although examples are given herein primarily involving a healthcare context, it will be recognized that the present disclosure is applicable to other types of enterprises who provide services to entities, the outcome of which may be impacted by the accuracy of entity matching. As such, the terms "entity," "patient," and "individual" may be used interchangeable herein.

Aspects of methods, systems, and computer-readable storage devices for providing improved entity matching are provided herein. FIG. 1A illustrates an example operating environment 100 in which various aspects of a universal identity manager (UIM) system 101 may operate. As illustrated, the UIM system 101 is in communication with one or more enterprise systems 102a-n (generally 102) and one or more reference databases 106a-n (generally 106). The one or more reference databases 106 may be included in the UIM system 101, or may be separate from the UIM system. The UIM system 101, the one or more enterprise systems 102, and the one or more reference databases 106 include one or more computing devices 112a-n (generally 112), includes one or more data storage devices 114a-n (generally 114), and is in communication with a network 103 or a combination of networks for exchanging data and coordinating operations as part of entity matching. The one or more computing devices 112 are illustrative of a wide variety of computing devices, the hardware of which is discussed in greater detail in regard to FIG. 6. The one or more computing devices 112 can be one of various types of computing devices. Non-limiting examples of computing devices 112 include servers, desktop computers, laptops computers, tablets, smart phones, personal digital assistants, and distributed systems that are run on multiple computing devices. Although not illustrated, one of ordinary skill in the art will appreciate that various intermediary computing and networking devices may exist between the illustrated elements of the operating environment 100 to facilitate communications between the various enumerated elements, for example via the Internet and one or more Intra nets.

Figure 1B:
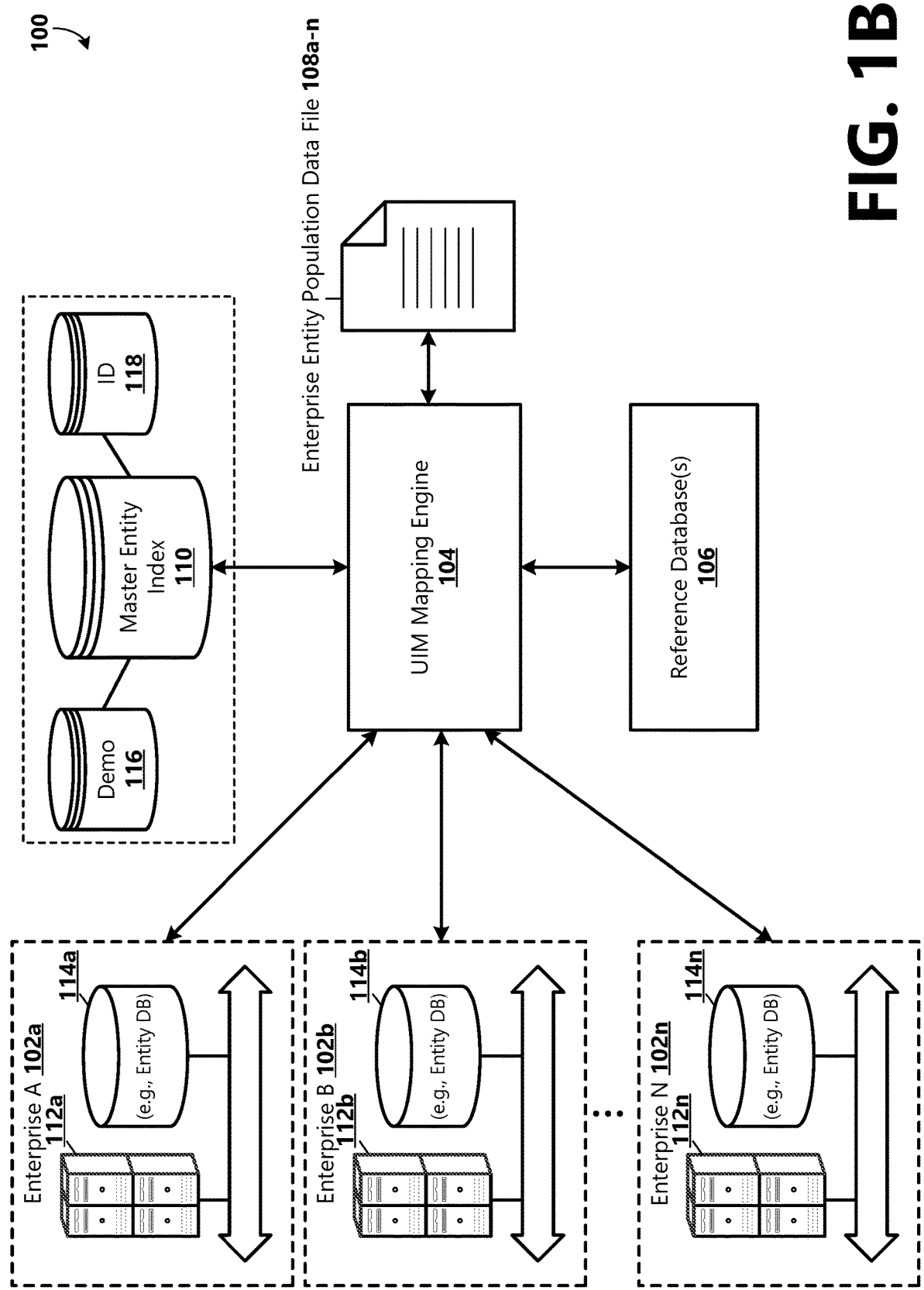

With reference now to FIG. 1B, the UIM system 101 comprises a UIM mapping engine 104, illustrative of one or more software applications, modules, or computing devices operative or configured to provide entity matching. According to an aspect, the UIM mapping engine 104 is configured to receive an enumeration of an entity database from one or more enterprise systems 102. For example, a computing device 112 of an enterprise system 102 may run a specific program to access the UIM mapping engine 104, or may access the UIM mapping engine via an Application Program Interface (API) or via a thin-client that is configured to communicate with the UIM mapping engine via a web browser. The enumeration of the entity database may be referred to herein as a data file or an enterprise entity population data file 108a-n (generally 108). An enterprise entity population data file 108 may comprise records of entities including demographic information and an enterprise-specific identifier of each entity, wherein the entities may be patients of a healthcare provider, clients of a legal professional, clients of a financial institution, students of a school, etc. Demographic information may include such information as, but are not limited to: first name, last name, date-of-birth (DOB), address, zip code, gender, phone number, social security number (SSN), etc.

According to an aspect, the UIM mapping engine 104 is configured to perform matching processes to determine uniqueness of each entity, and to assign a universal entity identifier (herein referred to as a universal ID or UID) to each unique entity. For example, as part of performing the matching processes, the UIM mapping engine 104 may include or be configured to execute one or more matching algorithms to compare the demographic information and enterprise-specific identifiers (IDs) included in the received enterprise entity population data file 108 for determining whether there are any matches between records in the data file 108. Data records may be determined to match based on probabilistic matching algorithms that compare various attributes (e.g., demographic data) for determining exact matches or approximate matches between one or a combination of attributes (e.g., matches between names, addresses, DOB, phone numbers).

According to an aspect, as part of performing the matching processes, the UIM mapping engine 104 may be further configured to query one or more reference databases 106 for determining linkages between entity information in data records in the enterprise entity population data file 108 based on additional reference data held by the one or more reference databases (e.g., marketing data, credit header data, correct address data, and other data sourced (e.g., purchased, integrated, obtained) from a data aggregator, data providers, or point-of-service data providers.) For example, the one or more reference databases 106 may include a compilation of various public and proprietary consumer data, and may comprise data records such as, but not limited to: public record information, change-of-address information, realty and property tax information, financial data, credit information, census data, etc.; wherein the data records may include current and past demographic data (e.g., names, addresses, age, gender, marital status, children and income) associated with an entity. The UIM mapping engine 104 may use the one or more reference databases 106 for determining additional or alternative demographic information (e.g., names, addresses, phone numbers, DOB) associated with a particular entity based on public and proprietary data collected and stored in the one or more reference databases.

The UIM mapping engine 104 may compare demographic data of the entities received in the enterprise entity population data file 108 against the additional/alternative demographic information obtained from the one or more reference databases 106 for identifying matches between records and for making a determination as to whether an entity described in one record is likely to be the same person as an entity described in another record, even when the demographic data included in the records may be incongruent. That is, the UIM mapping engine 104 may make a determination as to whether demographic data of one record in the enterprise entity population data file 108 may be linked to demographic data of another record in the data file based on matching the demographic data against additional/alternative demographic information obtained from reference data stored in the one or more reference databases 106. The UIM mapping engine 104 may be configured to determine a match based on a calculated match score, wherein a higher match score may indicate a higher-confidence match and a lower match score may indicate a lower-confidence match.

In various aspects, the UIM mapping engine 104 is further configured to make a determination as to whether demographic data of a record in the enterprise entity population data file 108 may be linked to demographic data of another record stored in the master entity index 110. For example, the master entity index 110 is illustrative of a data structure configured to store an index of records of demographic data of entities and identifiers associated with the entities. In some aspects, the UIM system 101 maintains a demographic database 116 as a subsystem, wherein the demographic database represents the one or more computing devices of a holder of demographic data associated with an entity. For example, the demographic database 116 may include demographic data of entities included in previously received enterprise entity population data files 108 from one or more enterprise systems 102. In some aspects, the UIM system 101 maintains a UID database 118 as a subsystem, wherein the UID database 118 represents the computing device of a holder of identifiers associated with an entity. For example, the UID database 118 is configured or operable to store, for each entity, one or a plurality of enterprise-specific IDs and a UID. In some implementations, the UID database 118 is a relational database where a UID has multiple enterprise-specific IDs associated with it, but a particular UID is only associated with one entity. In some aspects, the demographic database 116 and the UID database 118 may be a single database. In some aspects, the demographic database 116, the UID database 118, and the master entity index 110 are a single database.

According to an aspect, the UIM mapping engine 104 may work in conjunction with the master entity index 110 to identify a given person uniquely based on the demographic data in the data record or additional/alternative demographic data obtained from the one or more reference databases 106 matching the demographic data held by the master entity index 110. The UIM mapping engine 104 may be configured to use a probabilistic matching algorithm to determine whether the information about an entity included in a data record or additional/alternative demographic data determined to be associated with the entity indicate whether the entity described therein is an entity who has previously been associated with a UID (and if so, what the UID is) or whether a new UID should be created as the described entity is not associated with prior-gathered data records (e.g., enterprise entity population data file 108).

For example, a particular entity named Jane Smith may be a customer of a particular pharmacy (i.e., enterprise system 102a), Enterprise A Pharmacy. Enterprise A Pharmacy may send a batch file (e.g., enterprise entity population data file 108) of patient demographic information and enterprise-specific identifiers to the UIM mapping engine 104. The UIM mapping engine 104 may process the batch file using matching technologies (e.g., probabilistic matching on various attributes) and determine that Jane Smith is a unique entity who is identified by UID A123, and is included in more than one record in the enumeration of Enterprise A Pharmacy's entity database, wherein she is associated with two enterprise-specific identifiers: B456 and C789. Jane Smith's demographic information may be stored in the demographic database 116 in association with her UID (A123) and indexed in the master entity index 110. Additionally, Jane Smith's UID (A123) and two enterprise-specific identifiers (B456 and C789) may be stored in the UID database 118, and indexed in the master entity index 110.

In some implementations, the demographic data used by the UIM mapping engine 104 may be shared with the demographic database 116 so that as demographic details for a given entity are observed (e.g., a change of address or name, a misspelling/mis-entry of a data field) or as other enterprise-specific IDs are associated with the entity, the demographic database 116 may store those data for later matching to identify the entity again in the future. In some implementations, an enterprise-specific ID or a universal UID for an entity may be transmitted to the enterprise system 102 from which the enterprise entity population data file 108 is received, such that a forthcoming data record associated with the entity can include the shared UID for enabling a more efficient matching process.

According to aspects, an enterprise system 102 may operate as a requestor of enterprise-specific IDs associated with an entity. For example, a computing device 112 of the enterprise system 102 may run a specific program to access the UIM mapping engine 104 or may access the UIM mapping engine via an Application Program Interface (API) or via a thin-client that is configured to request and return entity mapping results comprising enterprise-specific IDs determined to be associated with an entity (previously identified in the enterprise's entity population/database enumeration) via a web browser. The request for entity mapping results may be an event-driven message, an API call, or other type of request message including demographic information describing an entity.

Figure 2:
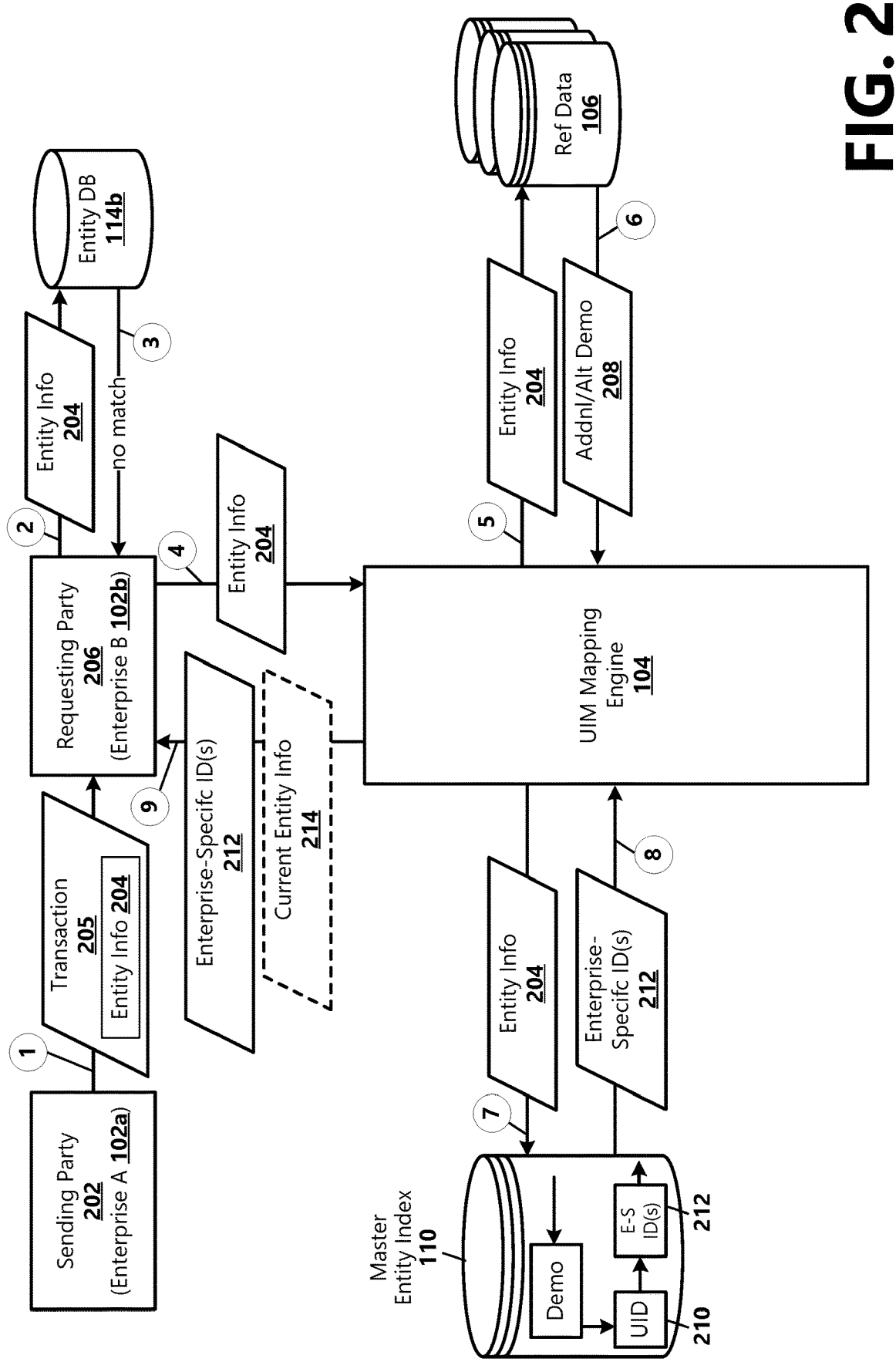
FIG. 2 illustrates an example data flow for providing improved entity matching.

FIG. 2 is a data flow diagram graphically representing an example flow of data as part of mapping an entity to one or more enterprise-specific IDs. The example data flow 200 illustrates various processes involved in the UIM system 101 as part of determining enterprise-specific IDs associated with an entity from receiving a request for the enterprise-specific IDs to providing a response to the request. Various arrows are labeled with circled numerals indicative of an example flow of data and/or operations among the components. As should be appreciated, some messages can be exchanged out of the order (e.g., substantially concurrently or in reverse order) as shown in FIG. 2. With reference now to FIG. 2, circled numeral 1 represents a first enterprise system 102a operating as a sending party 202 sending a transaction 205 including entity information 204 to a second enterprise system 102b. As used herein, the term "transaction" is used to describe a data file communicated between two or more enterprises 102, wherein the data file includes entity information 204, such as demographic data, that describes an entity. As an example, the first enterprise system 102a may be a healthcare provider system, an electronic prescribing (e-prescribing) device (112a), an e-prescribing clearinghouse, or the like. The transaction 205 may be a prescription (e.g., an electronic prescription (e-prescription), a call-in correspondence, a paper prescription) that describes a physician's order for the preparation and administration of a drug or device for a patient (entity). The first enterprise system 102a may send the transaction 205 for an entity (e.g., patient) to the second enterprise system 102b, wherein the second enterprise system may be a pharmacy operating to fill the prescription for the entity, and the prescription includes demographic information associated with the entity (i.e., entity information 204). Circled number 2 represents the second enterprise system 102b querying their database (e.g., entity database 114b) using the entity information 204 included in the transaction 205 embodied as a prescription for determining whether the entity described by the demographic information matches a patient in the second enterprise system's database.

In various examples, it is estimated that as many as 500% (e.g., 600 million) or as few as 10% (e.g., 120 million) of the e-prescriptions received by a pharmacy do not match a patient profile within the pharmacy's database (e.g., entity database 114b). While many retail pharmacies leverage basic forms of probabilistic matching to attempt to match an e-prescription to a patient profile, their current systems often rely on exact match logic, resulting in no matches scenarios approximately half the time. This causes pharmacy intake technicians to create new patient records, which, as described in the Background Section, may be duplicates of existing patients and can result in bad user-experiences, low patient satisfaction, and/or incorrect/improper medication administration or dispensing, which can result in serious adverse actions or even death.

Circled numeral 3 represents a no-match result, where the entity information 204 (e.g., demographic information) in the prescription does not match a patient profile in the second enterprise system's database 114b. Circled numeral 4 represents a call made to the UIM mapping engine 104 in real time (or near-real time) with the entity information 204 provided in the transaction 205 (e.g., prescription) sent from the first entity system 102a to the second entity system 102b.

Circled numeral 5 represents a query made to one or more reference databases 106 using the entity information 204 included in the transaction 205, and circled numeral 6 represents a query response including additional/alternative demographic data 208 that may be associated with the entity. For example, the one or more reference databases 106 may store information about the entity including one or more pieces of the entity information 204 included in the transaction 205 and one or more pieces of additional/alternative demographic data 208. The one or more pieces of additional/alternative demographic data 208 may include other names, addresses, phone numbers, the entity's DOB, SSN, or other information associated with the entity.

Circled numeral 7 represents a query made to the master entity index 110 for entity-specific IDs 212 associated with the entity using the entity information 204 included in the transaction 205 (e.g., prescription) and the additional/alternative demographic data 208 obtained about the entity described in the transaction 205. For example, the entity information 204 and/or the additional/alternative demographic data 208 may match demographic data and an associated UID 210 stored in the demographic database 116. In some examples, the entity information 204 and/or the additional/alternative demographic data 208 may be determined to match demographic data and an associated UID 210 of more than one entity stored in the demographic database 116. In example aspects, a match score may be determined for a match and provided with results. Although not illustrated, if a match is not determined (e.g., a UID 210 corresponding to the entity information 204 and/or the additional/alternative demographic data 208 is not stored in the master entity index 110), a response may be generated and transmitted to the requesting party 206 notifying the requesting party that the entity described in the transaction 205/prescription does not match an entity in the requesting party's entity database 114b or in the enumeration of the entity's database that the system 101 would have previously received in an enterprise entity population data file 108 and processed.

Upon determining a UID 210 associated with the entity information 204 and/or the additional/alternative demographic data 208, a query may be made to the master entity index 110 using the UID 210 for determining whether there is an enterprise-specific ID 212 stored in the UID database 118 and mapped to the UID. Specifically, the query may be for one or more enterprise-specific IDs 212 that are associated with the particular enterprise (e.g., Enterprise B 102) operating as the requesting party 206 (e.g., the enterprise receiving the transaction 205 from the sending party 202). As described above, one or more enterprise-specific IDs 212 may be stored in the UID database 118 and mapped to a UID 210 associated with an entity included in an enterprise entity population data file 108 (e.g., enumeration of the enterprise's entity database 114b) received from the enterprise system 102. Circled numeral 8 represents the one or more enterprise-specific IDs 212 determined to map to the UID 210 associated with the demographic data determined to match the entity information 204 included in the transaction 205/prescription and/or the additional/alternative demographic data 208 obtained from the one or more reference databases 106.

Circled number 9 represents a response generated and transmitted to the requesting party 206 (e.g., Enterprise B 102b). The response may include various data elements (e.g., the UID, the UID-to-requesting party identifier crosswalk, and/or reference data) that may provide improved match rate accuracy, reduce manual intervention, reduce labor costs, and improve the overall customer experience. According to an aspect, the response to the requesting party 206 may include the one or more enterprise-specific IDs 212 determined to match the entity described in the received transaction 205/prescription. In various examples, the response includes a match score associated with the confidence level of the match between the entity information 204 and the demographic data corresponding to the UID 210 and enterprise-specific IDs 212.

In some example aspects, the response (circled number 9) may include enterprise-supplied entity information for the identified entity. For example, the entity information 204 provided in the transaction 205/prescription may not match demographic data known by the requesting party 206 (e.g., which may be why the requesting party is unable to determine a matching entity in their entity database 114b and uses the UIM system 101 for finding possible matches). Accordingly, when a match is determined between the entity information 204 provided in the transaction 205/prescription and an entity in the enumeration of the requesting party's entity database (data file 208), the response to the requesting party 206 may include the demographic data (e.g., name, address, DOB, phone number, SSN) of the determined matching entity as the data was provided in the requesting party's entity database enumeration.

In other example aspects, the response (circled number 9) may include an augmented data response that includes current entity information 214 determined by the UIM mapping engine 104 as the most-recent information about the entity based on the reference data available and known about the entity. For example, the one or more reference databases 106 may store change-of-address information and other information that may be continually collected about the entity from various data sources. Based on the reference data about the entity, the UIM mapping engine 104 may make a determination about which entity information may be the most up-to-date information, and may provide the determined current entity information 214 to the requesting party 206 in the response (circled numeral 9).

Figure 3A:
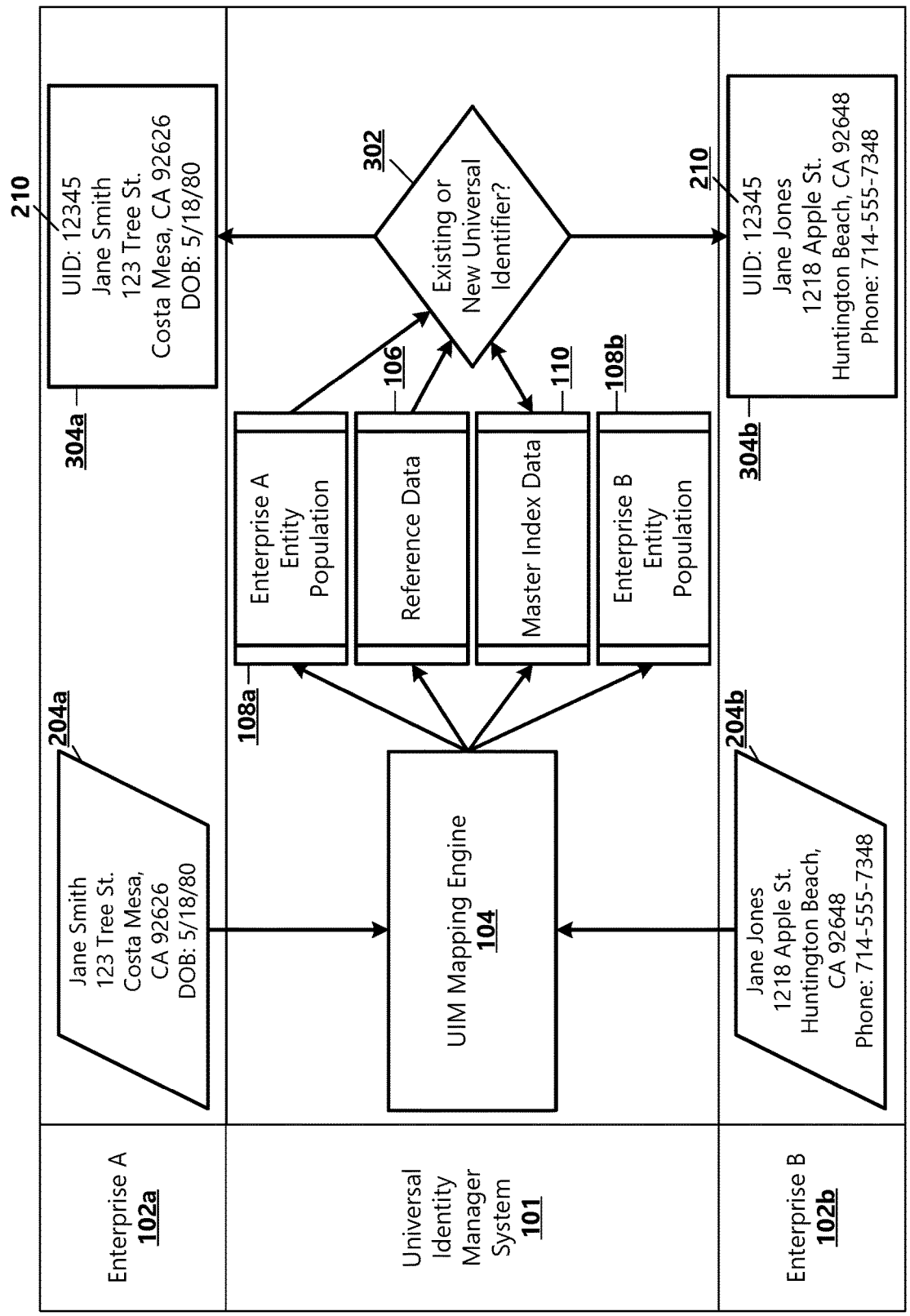
FIG. 3A illustrates example data responses that may be provided to a requestor.

FIG. 3A shows an example of different responses 304a,b that may be generated and provided between two enterprises 102a,b for identifying a same entity. For example, each or either enterprise 102a,b may send a request to the UIM system 101 for determining whether the entity described in entity information 204a,b matches an entity in the corresponding enterprise's entity population data files 108a,b (e.g., enumerations of the enterprises' databases 114a,b). Each enterprise 102a,b may provide demographic data about entities in the enterprise's entity population data files 108a,b (e.g., enumerations of the enterprises' databases 114a,b). A same entity may be included in both enterprises' entity population data files 108a,b; however, different demographic data (e.g., different names, different addresses, different types of information provided by each enterprise) may be used to describe the entity.

As shown in the illustrated example, there may be incongruences in the entity information 204a,b provided from different enterprises 102a,b about a same entity: Enterprise A 102a may send entity information 204a about the entity including a name (e.g., Jane Smith), an address (e.g., 123 Tree St. Costa Mesa, Calif. 92626), and a DOB (e.g., 5/18/80), and Enterprise B 102b may send entity information 204b about the same entity including a different name (e.g., Jane Jones), a different address (e.g., 1218 Apple St. Huntington Beach, Calif. 92648), and a phone number (e.g., 714-555-7348). Although the information provided by the two enterprises are different and may not match the corresponding enterprise's entity population data (e.g., the enumeration of the enterprise's database), the UIM mapping engine 104 may determine that the entity information 204a,b describe the same entity and that the entity is associated with a particular UID 210 (e.g., 12345).

When a response 304a,b is generated and provided to the enterprise(s) 102a,b, the UID 210 may be provided in the response 304a,b, but the enterprise-provided information may be delineated between the data that is being provided in the responses. As should be appreciated, the information included in the example responses 304a,b is for illustrative purposes. More, less, or other information may be included in a response. For example, the UID 210 may or may not be included in the response 304a,b. As another example, although not illustrated in FIG. 3A, one or more enterprise-specific IDs 212 may be included in the response 304a,b (e.g., Enterprise A 102a may receive a response 304a that includes one or more identifiers for the entity used by Enterprise A; Enterprise B 102b may receive a response 304b that includes one or more identifiers for the entity used by Enterprise B).

As illustrated, the UID 210 is consistent for the entity across the different enterprises 102a,b; however, according to an aspect, the entity information 204a,b provided by each enterprise may not be comingled based on privacy laws or settings that may restrict the distribution of certain data (e.g., an enterprise may only be allowed to receive data it may hold on an entity and may not be supplemented with other data held by another enterprise). For example, if there is a data gap in the demographic data about an entity included in an enterprise entity population data file 108a sent by Enterprise A 102a and the demographic data about the same entity included in an enterprise entity population data file 108b sent by Enterprise B 102b, the UIM mapping engine 104 may be configured to not supplement Enterprise A's entity enterprise entity population data or Enterprise B's enterprise entity population data with information provided by the other of those enterprises in a standard response 304a,b.

FIG. 3B shows an example of responses 304a,b that may be generated and provided between two enterprises 102a,b for identifying a same entity, wherein the responses include current entity information 214 about the entity. For example, one or both of the enterprises 102a,b may request (e.g., and may pay to receive) current entity information 214 determined for an entity based on reference data obtained about the entity from one or more reference databases 106. Each enterprise 102a,b may provide demographic data about entities in enterprise entity population data files 108a,b (e.g., enumerations of the enterprises' databases 114a,b), which may differ (e.g., different names, different addresses, different types of information provided). Responsive to receiving a request to match an entity to an entity in the requestor's population data (and optionally for current entity information 214 about the entity), the UIM mapping engine 104 may execute an algorithm (or make a call to another component to execute an algorithm) configured to try to match the entity and to determine the current entity information 214 for the particular entity. As illustrated in the example responses 304a,b, the UID 210 is the same; and the current entity information 214 provided to each of the two enterprises 102a,b may include the information determined to be the most up-to-date and reliable information based on reference data obtained about the entity from the one or more reference databases 106.

For example, as part of its matching process, the UIM mapping engine 104 may leverage credit header data, which may include a number of historical addresses that may be supplied by various data sources, such as the United States Post Office based on change-of-address forms, and other public and proprietary consumer data sources. As part of determining the most accurate and current entity information 214, the algorithm may evaluate the data source, a sequential order of the reference data, the number of times certain information is observed in the reference data, etc. In the illustrated example, the address included in the example responses 304a,b does not match either of the addresses provided by either of the enterprises 102a,b in the enterprise population data files 108a,b or in entity information 204 included in a transaction 205 with another enterprise; however, the address included in the example responses 304a,b may be the determined current entity information 214 for the entity based on reference data. As should be appreciated, the information included in the example responses 304a,b is for illustrative purposes. More, less, or other information may be included in a response.

Figure 4:
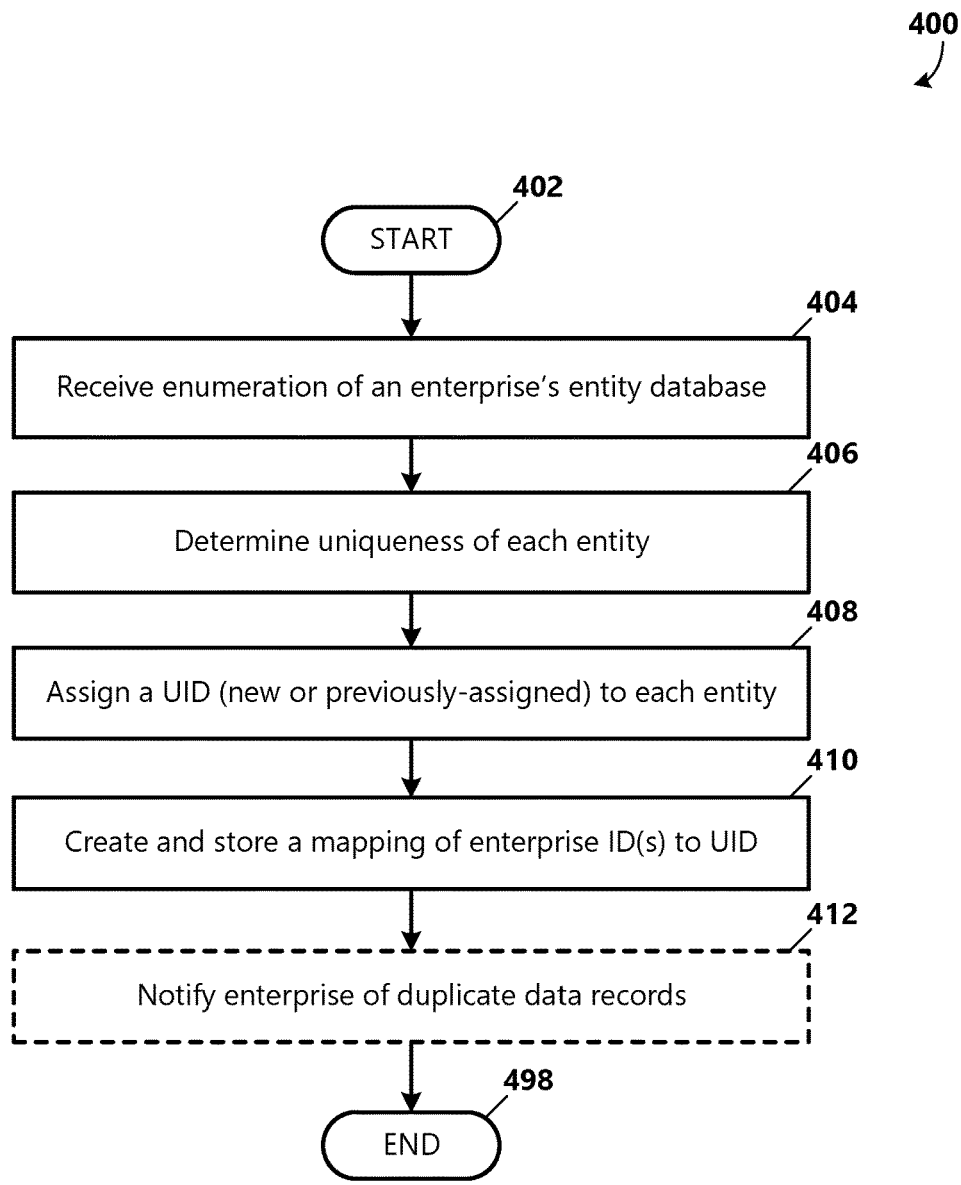
FIG. 4 is a flow chart showing general stages involved in an example method for identifying entities for providing improved entity matching.

FIG. 4 illustrates a flow chart showing general stages involved in an example method 400 for identifying entities for providing improved entity matching. The method 400 begins at OPERATION 402 and proceeds to OPERATION 404, where an enterprise entity population data file 108 including an enumeration of an enterprise's entity database may be received. According to an aspect, an enterprise entity population data file 108 including an enumeration of an enterprise's entity database may be received from a plurality of enterprises. The enterprise entity population data file 108 may include a plurality of data records associated with a plurality of entities, wherein each record may be associated with an entity, and may include an enterprise-specific ID 212 and demographic data describing the entity. As should be appreciated, various data records included in the data file 108 may be duplicates, wherein more than one data record may be associated with a same entity. Accordingly, more than one enterprise-specific ID 212 may be associated with the same entity.

At OPERATION 406, uniqueness of each entity may be determined. In an example aspect, the enterprise-specific ID 212 and demographic data in the enterprise entity population data file 108 may be compared using probabilistic matching techniques for identifying matches between data records. In another example aspect, one or more reference databases 106 may be queried using demographic data in the enterprise entity population data file 108 for obtaining additional/alternative reference data about the entities described in the data records for identifying matches between data records in the enterprise entity population data file 108 and for identifying matches between an entity in the data file and a previously-identified entity stored in master entity index 110. For example, the additional/alternative reference data and the demographic data in the enterprise entity population data file 108 and demographic data of entities stored in a demographic database 116/indexed in the master entity index 110 may be compared using probabilistic matching techniques for identifying matches between data records/entities.

At OPERATION 408, a new or previously-assigned UID 210 may be assigned to each unique entity included in the enterprise entity population data file 108. For example, if a match is determined between an entity/data record in the enterprise entity population data file 108 and another entity/data record, a previously-assigned UID 210 may be assigned to the matching data record in the enterprise entity population data file 108. If a match is not determined, a new UID 210 may be assigned to the data record/entity.

At OPERATION 410, the demographic data describing a uniquely-identified entity may be stored in the demographic database 116 and mapped to the UID 210. Additionally, a mapping between the UID 210 and one or more enterprise-specific IDs 212 may be stored in the UID database 118. The master entity index 110 may be updated with the stored demographic data and IDs. In some examples, the master entity index 110 may be operable and configured to distinguish the sources of data records so that various privacy policies set by those sources will be respected so that enterprise-specific information may not be shared with other enterprises.

At OPTIONAL OPEATION 412, a response may be generated and provided to the enterprise 102 that includes a notification of duplicate data records (e.g., more than one data record in the enterprise entity population data file 108 that are determined to be likely associated with a same entity). Accordingly, the enterprise 102 may be enabled to make a determination as to whether to merge the records, obtain more information from the entities, etc. In an example aspect, a match score may be provided with the determined matches (e.g., determined duplicates). The method 400 ends at OPERATION 498.

Figure 5:
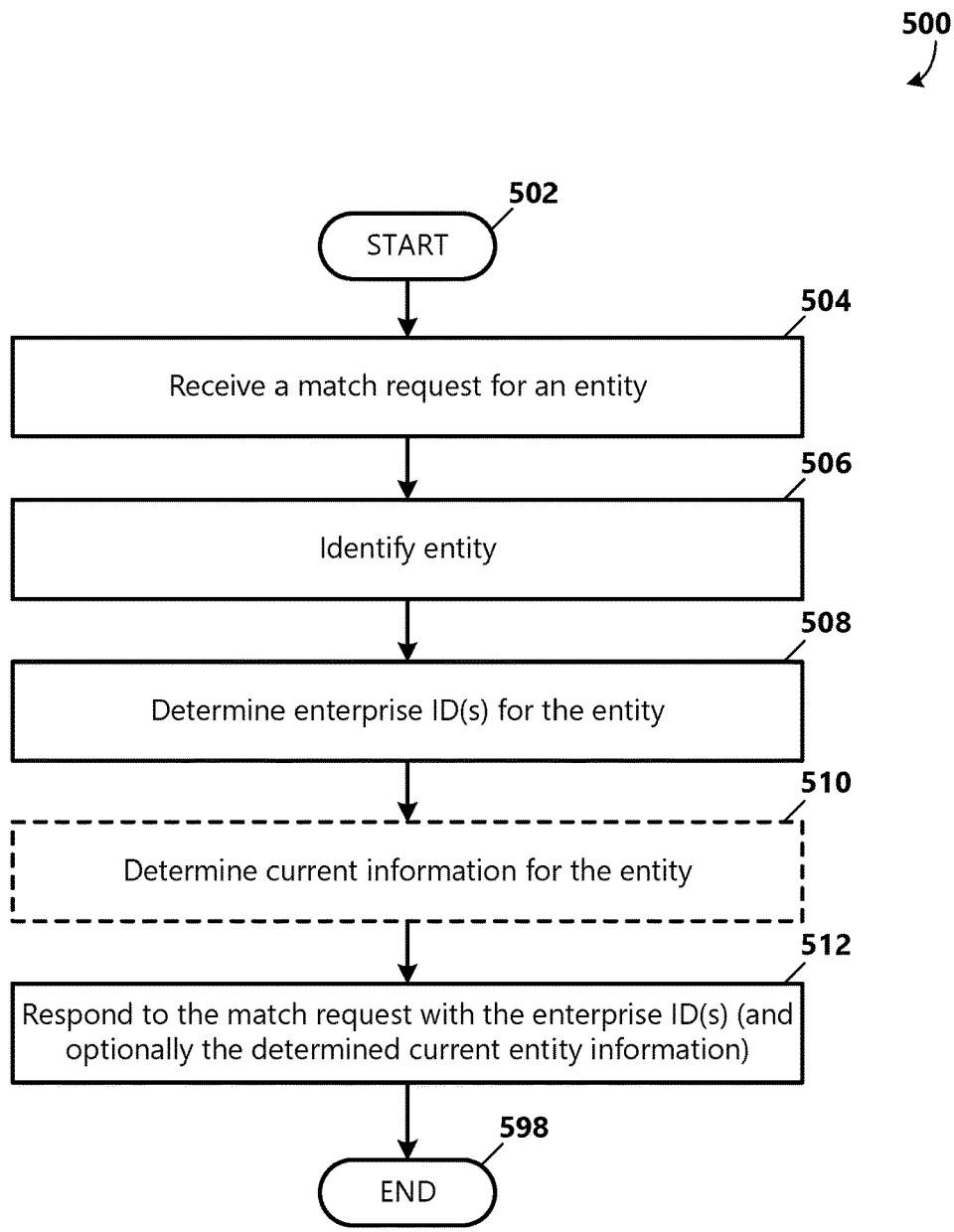
FIG. 5 is a flow chart showing general stages involved in an example method for mapping an entity to a previously enumerated entity in a requestor's entity database.

FIG. 5 is a flow chart showing general stages involved in an example method for mapping an entity to a previously enumerated entity in a requestor's entity database. The method 500 starts at OPERATION 502 and proceeds to OPERATION 504, where a match request for an entity may be received from a requesting party 206. For example, the match request may include entity information 204 about an entity provided in a transaction 205 by another enterprise (e.g., sending party 202), wherein the entity information may not match entity information for an entity in the requesting party's entity database 114 (e.g., based on matching processes/techniques used by the requesting party).

At OPERATION 506, the entity information 204 included in the request may be used to query one or more reference databases 106 for additional/alternative reference data 208 associated with the entity described in the request. For example, other names, addresses, phone number, and other information associated with the entity may be retrieved. Further, the additional/alternative reference data 208 may be used to query the master entity index 110 for possible matches. Probabilistic matching techniques may be used to identify a match and to calculate a match score. When a match is determined, the UID 210 associated with the matched entity/data record may be identified.

At OPERATION 508, the UID 210 may be mapped to one or more enterprise-specific IDs 212 stored in the UID database 118. For example, a plurality of records for the identified entity may be stored in association with a plurality of enterprise-specific IDs 212 in the enterprise's entity database 114. Based on the identification of the entity using the additional/alternative reference data 208, the UID 210 of the identified entity can be cross-walked to the one or more enterprise-specific IDs 212.

At OPTIONAL OPERATION 510, current entity information 214 for the entity may be determined based on obtained additional/alternative reference data 208. For example, the current entity information 214 may include demographic data determined to be the most up-to-date, accurate, and reliable demographic information about the entity according to an analysis of the additional/alternative reference data 208 obtained about the entity from the one or more reference databases 106.

At OPERATION 512, a response 304 may be generated and transmitted to the requesting party 206, wherein the response may include one or a combination of: the one or more enterprise-specific IDs 212, a UID 210, and enterprise-specific demographic data of one or more entities determined to match the entity information 204 included in the request. In some examples, if current entity information 214 is requested, the response 304 may further include the determined current entity information 214 about the entity. Accordingly, the enterprise 102 may be enabled to make a determination as to whether to select an identified matching data record to synchronize with the entity information 204 received from the other enterprise 102 (i.e., sending party 202). The requesting party 206 may choose to synchronize the entity information with a determined matching entity/data record, obtain more information from the entity, etc. In an example aspect, a match score may be provided with the determined matches. The method 500 ends at OPERATION 598.

Figure 6:
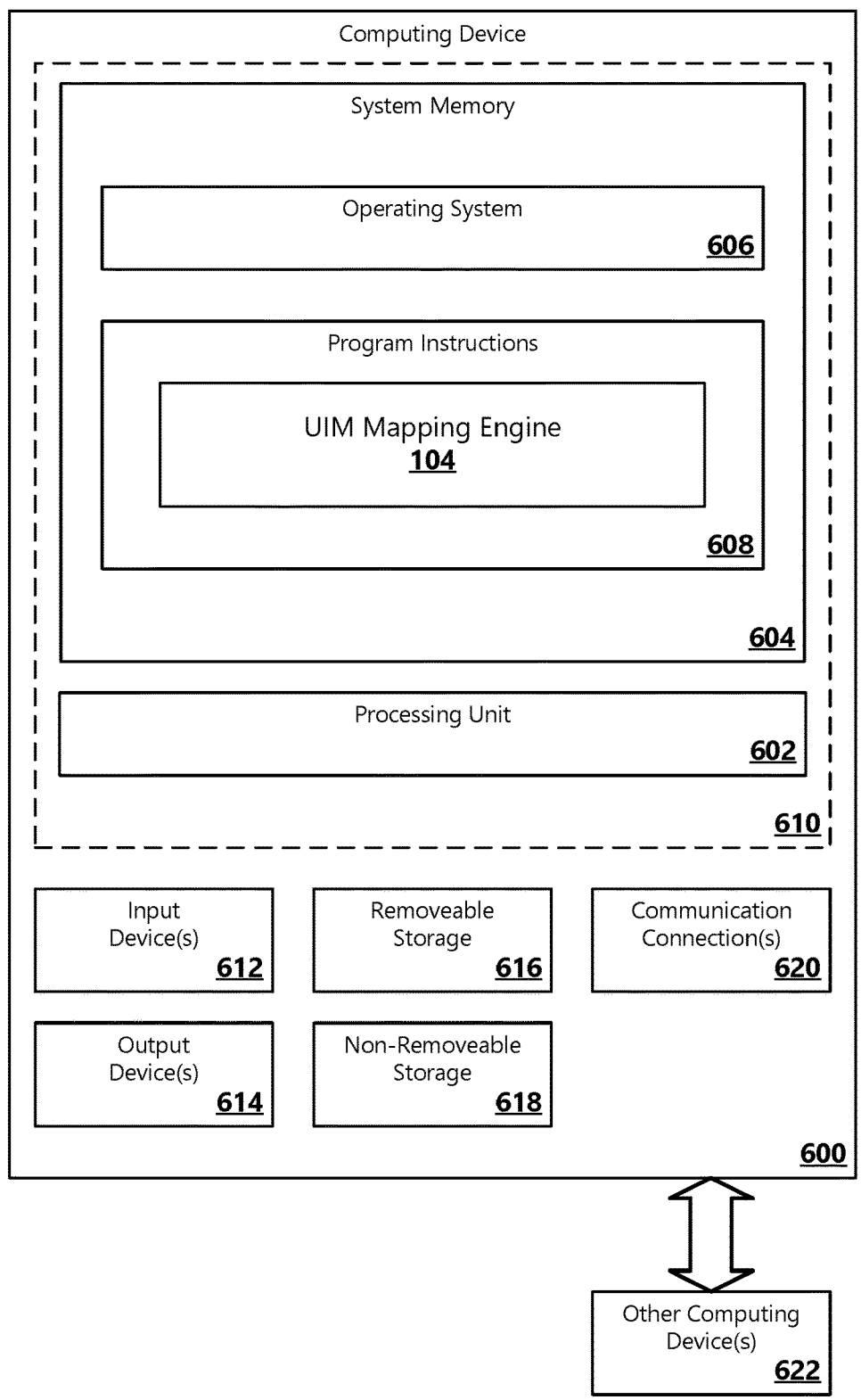
FIG. 6 is a block diagram illustrating example physical components of a computing device with which aspects of the system may be practiced.

FIG. 6 is a block diagram illustrating physical components of an example computing device with which aspects may be practiced. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608, and may include sufficient computer-executable instructions for the UIM mapping engine 104, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for identifying an entity, comprising:
at least one processing device; and
at least one computer readable data storage device storing instructions that, when executed by the at least one processing device, cause the system to:
receive an electronic request, via an application programming interface, from a first enterprise system associated with a first enterprise to identify an entity, wherein the electronic request includes:
first demographic data associated with the entity and an indication of the first enterprise, the first demographic data in a first format associated with the first enterprise;
use the first demographic data to generate an electronic request to a service provider requesting second demographic data associated with the entity where the second demographic data includes additional demographic data associated with the entity from a reference database of the service provider and is different from the first demographic data;
receive an electronic response associated with the electronic request, the electronic response including second demographic data associated with the entity and in a second format associated with the service provider;
access a universal identity manager mapping engine, the universal identity manager mapping engine configured to manage a set of universal identifiers associated with various entities and an enterprise-specific set of identifiers corresponding to the first enterprise, wherein the set of universal identifiers and the enterprise-specific set of identifiers are different;
convert the second demographic data into a standard format associated with the universal identity manager mapping engine; generate and execute a query of the universal identity manager mapping system using the converted second demographic data;
access, from the universal identity manager mapping engine, a universal identifier of the set of universal identifiers that is associated with the entity;
map the universal identifier to one or more enterprise-specific identifiers associated with the entity of the enterprise-specific set of identifiers; and
generate an electronic response message for transmission via an application programming interface, the electronic response message associated with the electronic request, and configured for delivery to the first enterprise system, the electronic response message including the one or more enterprise-specific identifiers associated with the entity and the first enterprise.

2. The system of claim 1, wherein the system stores additional instructions that, when executed by the at least one processing device, further causes the system to:
receive a subsequent request from another enterprise to identify the entity, wherein the entity is described by third demographic data included in the subsequent request, and the third demographic data included in the subsequent request are different from the first demographic data included in the previous request;
use the third demographic data included in the subsequent request to obtain the additional demographic data associated with the entity from the reference database;
use the additional demographic data to query an index of the universal identity manager mapping engine for a universal identifier corresponding to the additional demographic data;
map the universal identifier to one or more other enterprise-specific identifiers associated with the entity, wherein the one or more other enterprise-specific identifiers are specific to the other enterprise; and
generate a response to the subsequent request including the one or more other enterprise-specific identifiers associated with the entity.

3. The system of claim 1, wherein prior to receiving the electronic request to identify the entity, the system stores additional instructions that, when executed by the at least one processing device, further causes the system to:
receive a data file from the first enterprise including a listing of entities, the listing of entities including new demographic data and an enterprise-specific identifier associated with each entity;
assign a universal identifier to each entity in the listing of entities; and
store, in the index, the new demographic data, the enterprise-specific identifier associated with the entity, and the universal identifier for each entity.

4. The system of claim 3, wherein, the data file is an enumeration of the first enterprise's entity database.

5. The system of claim 3, wherein in assigning the universal identifier to each entity, the system stores additional instructions that, when executed by the at least one processing device, further causes the system to:
determine an entity included in the listing of entities is associated with a plurality of enterprise-specific identifiers; and
store the plurality of enterprise-specific identifiers in the index in association with the entity.

6. The system of claim 5, wherein in determining the entity included in the listing of entities is associated with a plurality of enterprise-specific identifiers, the system stores additional instructions that, when executed by the at least one processing device, further causes the system to:
compare the new demographic data associated with the entity with demographic data associated with other entities included in the listing of entities for determining exact or approximate matches between one or a combination of demographic data.

7. The system of claim 6, wherein the system stores additional instructions that, when executed by the at least one processing device, further causes the system to:
use the demographic data associated with the entity to obtain additional reference demographic data associated with the entity from the reference database; and
compare the additional reference demographic data associated with the entity with the demographic data associated with other entities included in the listing of entities for determining exact or approximate matches between one or a combination of demographic data.

8. The system of claim 1, wherein the system stores additional instructions that, when executed by the at least one processing device, further causes the system to:
determine current demographic information for the entity based on the additional demographic data obtained about the entity from the reference database; and
include, in the electronic response message, the current demographic information for the entity.

9. The system of claim 1, wherein the system stores additional instructions that, when executed by the at least one processing device, further causes the system to include the universal identifier in the electronic response message.

10. The system of claim 1, wherein:
the reference database includes one or more reference databases; and
the one or more reference databases comprise at least one of:
marketing data;
credit header data;
correct address data; or
other data sourced from a data aggregator, data providers, or point-of-service data providers.

11. The system of claim 1, wherein:
the electronic response message further includes one or more items of demographic data provided by another enterprise; and
the first enterprise and the other enterprise use different entity-specific identifiers in association with the entity.

12. A computer-implemented method for providing entity identification, the computer-implemented method comprising:
receiving an electronic request, via an application programming interface, from a first enterprise system associated with a first enterprise to identify an entity, wherein the electronic request includes: first demographic data associated with the entity and an indication of the first enterprise, the first demographic data in a first format associated with the first enterprise;
using the first demographic data to generate an electronic request to a service provider requesting second demographic data associated with the entity where the second demographic data includes additional demographic data associated with the entity from a reference database of the service provider and is different from the first demographic data;
receiving an electronic response associated with the electronic request, the electronic response including second demographic data associated with the entity and in a second format associated with the service provider;
accessing a universal identity manager mapping engine, the universal identity manager mapping engine configured to manage a set of universal identifiers associated with various entities and an enterprise-specific set of identifiers corresponding to the first enterprise, wherein the set of universal identifiers and the enterprise-specific set of identifiers are different;
converting the second demographic data into a standard format associated with the universal identity manager mapping engine;
generate and execute a query of the universal identity manager mapping system using the converted second demographic data;
mapping the universal identifier to one or more enterprise-specific identifiers associated with the entity of the enterprise-specific set of identifiers; and
generating an electronic response message for transmission via an application programming interface, the electronic response message associated with the electronic request and configured for delivery to the first enterprise system, the secure electronic response message including the one or more enterprise-specific identifiers associated with the entity and the first enterprise.

13. The computer-implemented method of claim 12, wherein prior to receiving the electronic request to identify the entity, the computer-implemented method further comprises:
receiving a data file from the first enterprise including a listing of entities, the listing of entities including new demographic data and an enterprise-specific identifier associated with each entity;
assigning a universal identifier to each entity in the listing of entities; and
storing, in an index of the universal identity manager mapping engine, the new demographic data, the enterprise-specific identifier associated with the entity, and the universal identifier for each entity.

14. The computer-implemented method of claim 13, wherein assigning the universal identifier to each entity comprises:
determining an entity has a previously-assigned universal identifier; and
associating the previously-assigned universal identifier with the entity or determining an entity does not have a previously-assigned universal identifier; and
creating a new universal identifier for assignment to the entity.

15. The computer-implemented method of claim 12, further comprising:
receiving a subsequent request from another enterprise to identify the entity, wherein:
the entity is described by third demographic data included in the subsequent request; and
the third demographic data included in the subsequent request are different from the demographic data included in the previous request;
using the demographic data included in the subsequent request to obtain the additional demographic data associated with the entity from the reference database;
using the additional demographic data to query an index of the universal identity manager mapping engine for a universal identifier corresponding to the additional demographic data;
mapping the universal identifier to one or more other enterprise-specific identifiers associated with the entity, wherein the one or more other enterprise-specific identifiers are specific to the other enterprise; and
generating a response to the subsequent request including the one or more other enterprise-specific identifiers associated with the entity.

16. The computer-implemented method of claim 12, further comprising:
- determining current demographic information for the entity based on additional demographic data obtained about the entity from the reference database; and
- including, in the secure electronic response message, the current demographic information for the entity.

17. A non-transitory computer-readable storage device including computer readable instructions, which when executed by a processing unit are configured to:
- receive an electronic request, via an application programming interface, from a first enterprise system associated with a first enterprise to identify an entity, wherein the electronic request includes:
  - first demographic data associated with the entity and an indication of the first enterprise, the first demographic data in a first format associated with the first enterprise and provided by a second enterprise;
- use the first demographic data to generate an electronic request to a service provider requesting second demographic data associated with the entity where the second demographic data includes additional demographic data associated with the entity from a reference database of the service provider and is different from the first demographic data;
- receive an electronic response associated with the electronic request, the electronic response including second demographic data associated with the entity and in a second format associated with the service provider;
- access a universal identity manager mapping engine, the universal identity manager mapping engine configured to manage a set of universal identifiers associated with various entities and an enterprise-specific set of identifiers corresponding to the first enterprise, wherein the set of universal identifiers and the enterprise-specific set of identifiers are different;
- convert the second demographic data into a standard format associated with the universal identity manager mapping engine;
- generate and execute a query of the universal identity manager mapping system using the converted second demographic data;
- access, from the universal identity manager mapping engine, a universal identifier of the set of universal identifiers that is associated with the entity;
- map the universal identifier to one or more enterprise-specific identifiers associated with the entity of the enterprise-specific set of identifiers, wherein the one or more enterprise-specific identifiers are specific to the first enterprise; and
- generate an electronic response message for transmission via an application programming interface, the electronic response message associated with the electronic request, and configured for delivery to the first enterprise system, the electronic response message including the one or more enterprise-specific identifiers associated with the entity and the first enterprise.

18. The non-transitory computer-readable storage device of claim 17, further including computer readable instructions that prior to receiving the electronic request to identify the entity, when executed by the processing unit are configured to:
- receive a data file from the first enterprise including a listing of entities, the listing of entities including new demographic data and an enterprise-specific identifier associated with each entity, wherein the enterprise-specific identifier is specific to the enterprise;
- determine uniqueness of each entity in the listing of entities;
- assign a universal identifier to each unique entity; and
- store, in an index of the universal identity manager mapping engine, the new demographic data, one or more enterprise-specific identifiers associated with the entity, and the universal identifier for each entity.

19. The non-transitory computer-readable storage device of claim 18, further including computer readable instructions that when in determining uniqueness of each entity, and when executed by the processing unit are configured to:
- compare the new demographic data associated with the entity with demographic data associated with other entities included in the listing of entities for determining exact or approximate matches between one or a combination of demographic data; and
- use the demographic data associated with the entity to obtain additional reference demographic data associated with the entity from the reference database; and
- compare the reference demographic data associated with the entity with the additional demographic data associated with the entity and with the demographic data associated with other entities included in the listing of entities for determining exact or approximate matches between one or a combination of demographic data.

20. The non-transitory computer-readable storage device of claim 18, further including computer readable instructions that when executed by the processing unit are configured to:
- determine current demographic information for the entity based on additional demographic data obtained about the entity from the reference database; and
- include, in the electronic response message, the current demographic information for the entity.

* * * * *